United States Patent
Kim et al.

(10) Patent No.: US 9,456,725 B2
(45) Date of Patent: Oct. 4, 2016

(54) ROBOT CLEANER AND CONTROL METHOD THEREOF

(75) Inventors: Dong Won Kim, Hwaseong-si (KR); Jun Hwa Lee, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 805 days.

(21) Appl. No.: 13/373,192

(22) Filed: Nov. 8, 2011

(65) Prior Publication Data

US 2012/0125363 A1 May 24, 2012

(30) Foreign Application Priority Data

Nov. 24, 2010 (KR) .......................... 10-2010-0117332

(51) Int. Cl.
*B08B 7/00* (2006.01)
*B08B 7/04* (2006.01)
(Continued)

(52) U.S. Cl.
CPC ............... *A47L 9/2826* (2013.01); *A47L 9/28* (2013.01); *A47L 9/2805* (2013.01); *A47L 9/2831* (2013.01); *A47L 9/2847* (2013.01); *A47L 9/2852* (2013.01); *A47L 9/2857* (2013.01); *G05D 1/0274* (2013.01); *A47L 2201/02* (2013.01); *A47L 2201/022* (2013.01); *A47L 2201/04* (2013.01); *A47L 2201/06* (2013.01);
(Continued)

(58) Field of Classification Search
CPC ..... A47L 9/28; A47L 9/2826; A47L 9/2831; A47L 9/2847; A47L 9/2852; A47L 9/2857; A47L 2201/02; A47L 2201/022; A47L 2201/04; A47L 9/2805; G05D 2201/0203; G05D 1/0227; G05D 1/0242; G05D 1/0246; G05D 1/0255; G05D 1/0274
USPC ................ 134/6, 18; 15/49.1; 700/258, 259
See application file for complete search history.

(56) References Cited

U.S. PATENT DOCUMENTS

| 6,605,156 B1 * | 8/2003 | Clark et al. ...................... 134/6 |
| 2004/0204792 A1 * | 10/2004 | Taylor .................. A47L 9/2805 700/245 |

(Continued)

FOREIGN PATENT DOCUMENTS

| CN | 101480795 | 7/2009 |
| DE | 10 2004 010 827 | 9/2005 |

(Continued)

OTHER PUBLICATIONS

Translation of DE 102004010827.*
(Continued)

*Primary Examiner* — Alexander Markoff
(74) *Attorney, Agent, or Firm* — Staas & Halsey LLP

(57) ABSTRACT

A robot cleaner includes a main brush to sweep or scatter dust off a floor, a main brush motor to rotate the main brush, a Revolution Per Minute (RPM) detector to detect an RPM of the main brush motor, and a control unit to determine a type of floor according to the RPM of the main brush motor acquired by the RPM detector and control an operation of the robot cleaner based on the determined type of floor. A carpet mode to clean only a carpet area and a hard floor mode to clean a hard floor area excluding the carpet area are given based on detected information relating to the material of a floor, which enables partial cleaning with respect to a cleaning area selected by a user and adjustment in the number of cleaning operations or the intensity of cleaning according to the material of the floor.

8 Claims, 13 Drawing Sheets

(51) Int. Cl.
*B08B 1/04* (2006.01)
*A47L 9/28* (2006.01)
*G05D 1/02* (2006.01)

(52) U.S. Cl.
CPC ......... *G05D 1/0227* (2013.01); *G05D 1/0242* (2013.01); *G05D 1/0246* (2013.01); *G05D 1/0255* (2013.01); *G05D 2201/0203* (2013.01)

(56) References Cited

U.S. PATENT DOCUMENTS

| | | | |
|---|---|---|---|
| 2005/0022330 A1* | 2/2005 | Park | A47L 7/0061 15/319 |
| 2005/0065662 A1* | 3/2005 | Reindle et al. | 701/1 |
| 2005/0278888 A1* | 12/2005 | Reindle et al. | 15/319 |
| 2006/0085095 A1* | 4/2006 | Reindle et al. | 700/258 |

FOREIGN PATENT DOCUMENTS

| | | |
|---|---|---|
| EP | 0 527 567 | 7/1992 |
| KR | 100565260 B1 * | 3/2006 |
| WO | WO 2010/051423 | 5/2010 |

OTHER PUBLICATIONS

European Search Report issued Jul. 31, 2013 in corresponding European Application No. 11 18 9546.
Espacenet English Abstract of Chinese Publication No. 101480795, Published Jul. 15, 2009.
Chinese Office Action dated May 22, 2015 in corresponding Chinese Patent Application No. 201110399544.6.
European Decision on Grant dated Feb. 22, 2016 in corresponding European Patent Application 11 189 546.2.

* cited by examiner

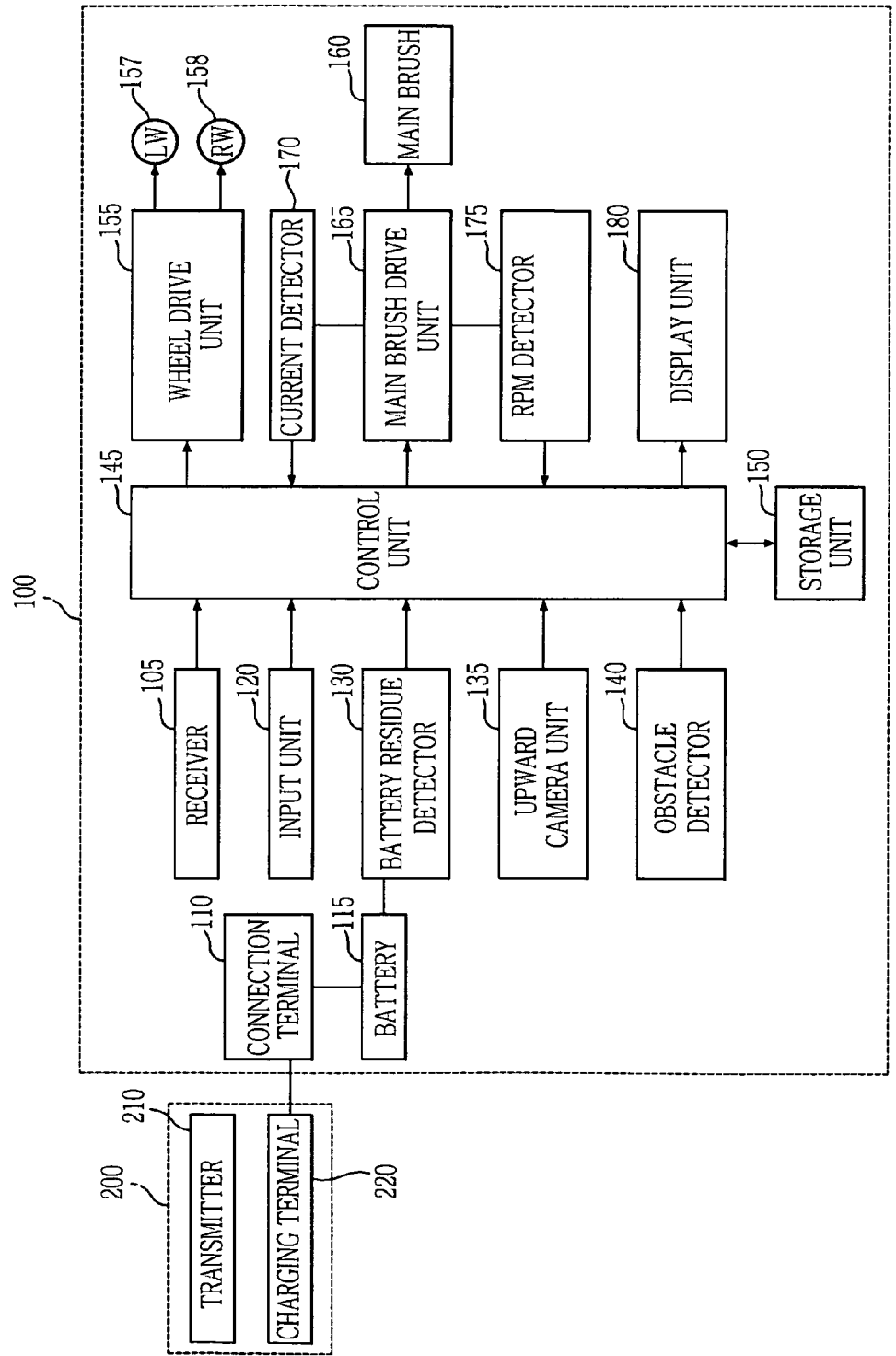

(a)  (b)

FIG. 7
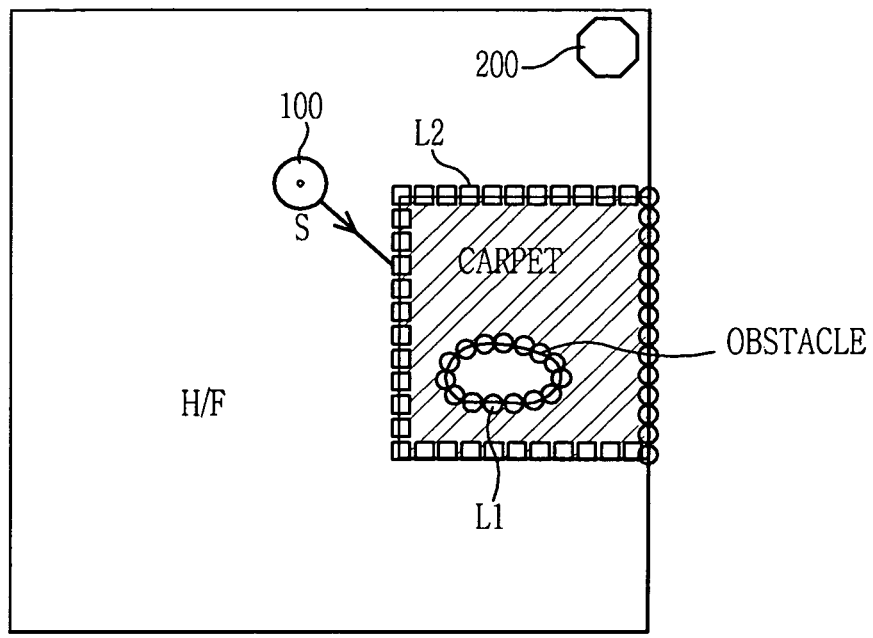
(a)
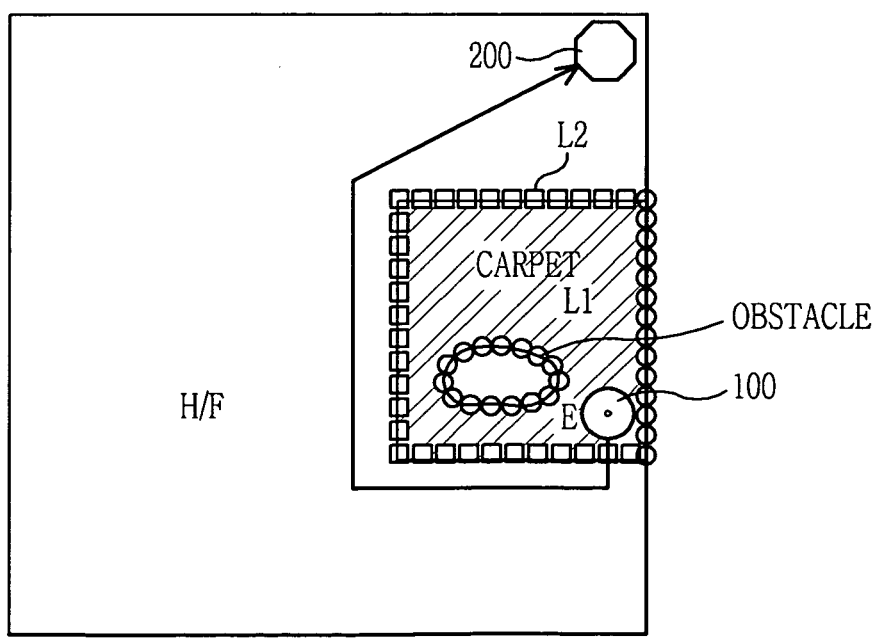
(b)

FIG. 8
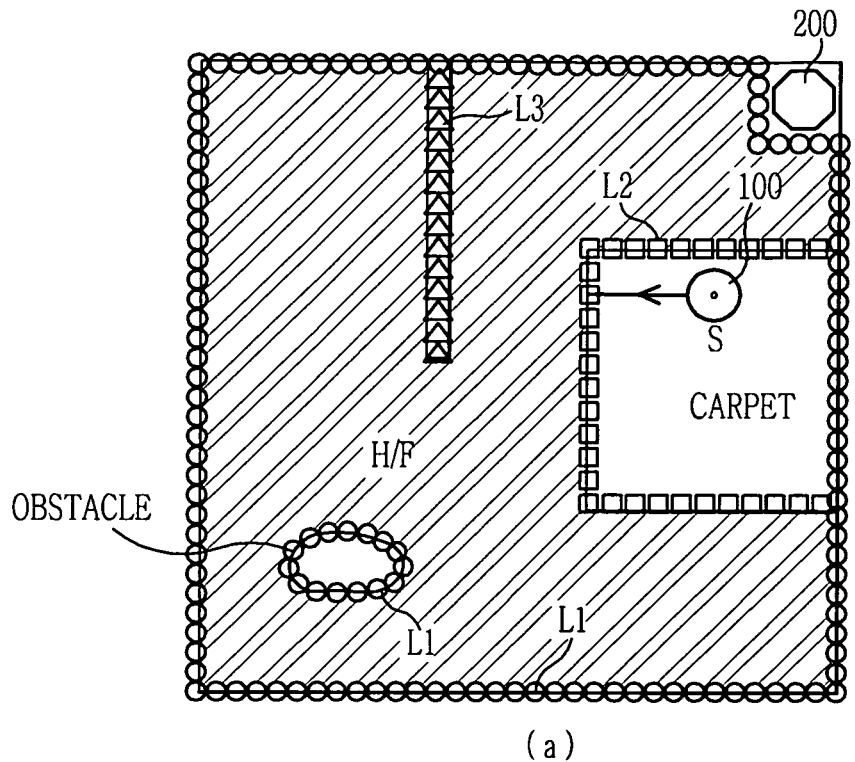
(a)
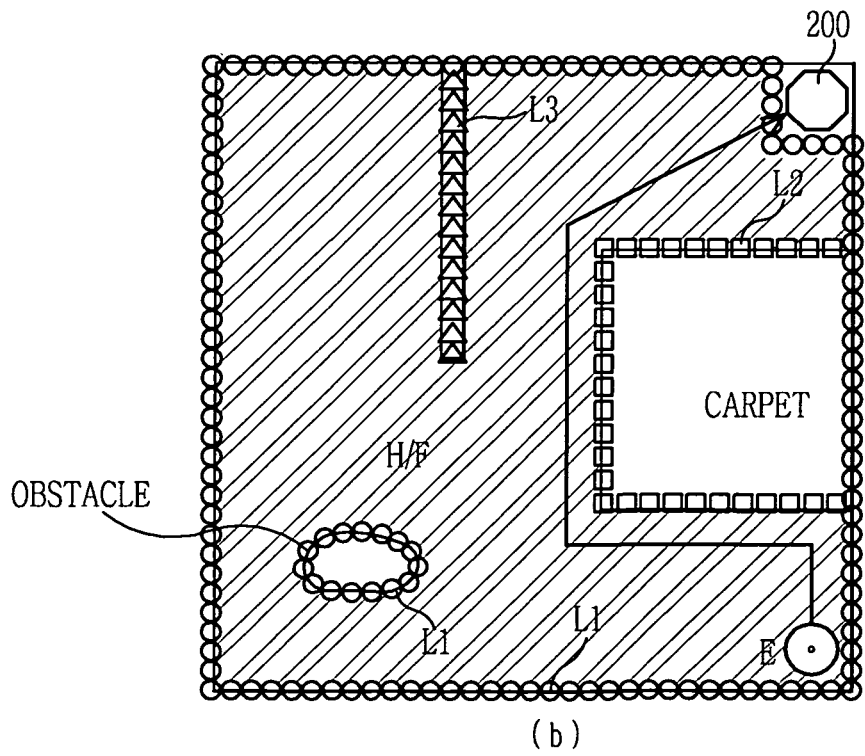
(b)

FIG. 9
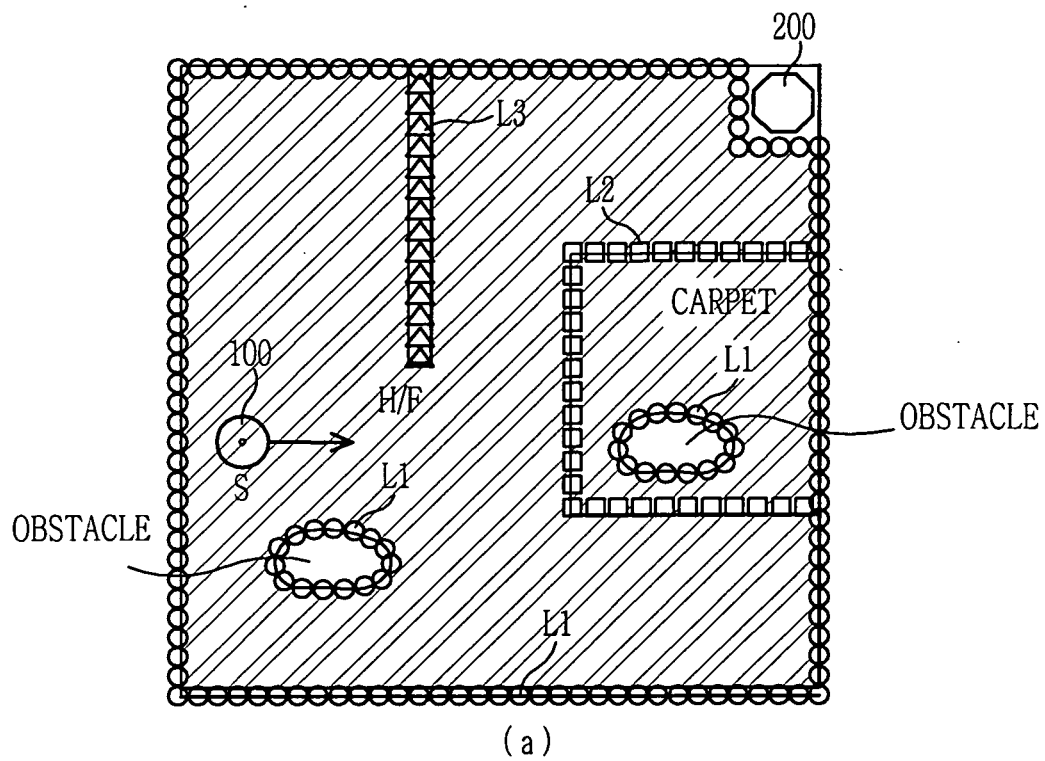
(a)
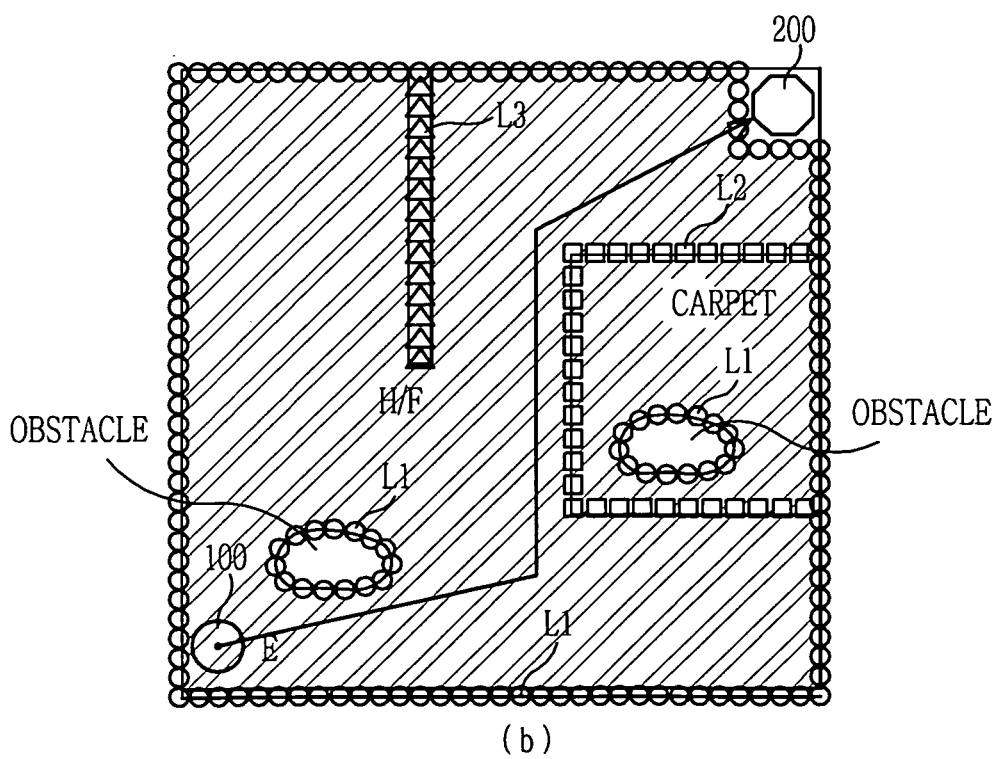
(b)

ROBOT CLEANER AND CONTROL METHOD THEREOF

CROSS-REFERENCE TO RELATED APPLICATIONS

This application claims the benefit of Korean Patent Application No. 2010-0117332, filed on Nov. 24, 2010 in the Korean Intellectual Property Office, the disclosure of which is incorporated herein by reference.

BACKGROUND

1. Field

Embodiments of the present disclosure relate to a robot cleaner to perform a cleaning operation according to the material or state of a floor and a control method thereof.

2. Description of the Related Art

In general, a robot cleaner automatically cleans an area to be cleaned by sucking up foreign substances, such as dust, from a floor while autonomously traveling about the area to be cleaned without user manipulation. During cleaning, the robot cleaner detects a distance from an object, such as furniture, office appliances and walls, present in the cleaning area using an infrared sensor, etc., to travel without collision with the obstacle based on detected information.

Cleaning a given cleaning area using the robot cleaner means an operation in which the robot cleaner repeatedly travels in the cleaning area based on a preset traveling pattern to clean the area. The cleaning area in which the robot cleaner travels to perform a cleaning operation may have irregularity in the material or state of a floor. In particular, most European and American houses contain a soft floor, on which a carpet is spread and a hard floor such as a wooden floor (hereinafter, referred to as 'H/F') together.

Since the quantity of dust adhered to the carpet is about four times greater than that present on the H/F, uniformly cleaning a given cleaning area using the robot cleaner may require variation in the number of cleaning operations (the number of traveling motions) or the intensity of cleaning according to the material or state of a floor. In addition, a user may desire to clean only a partial area rather than the entire area. For example, a user who mainly spends time in an area on which a carpet is spread (hereinafter, referred to as a 'carpet area') may judge that the carpet area has a greater necessity for cleaning than the H/F area and may desire to clean only the carpet area or repeatedly clean the carpet area. In this case, to allow the user to partially or repeatedly clean only the carpet area, a method of allowing the robot cleaner to stay in a specific area to clean the specific area by making a virtual wall using, e.g., infrared signals from an infrared transmitter installed at a door or the entrance of a separated space, such as a corridor, or by installing an obstacle at a door or the entrance of a corridor has been adopted.

However, the method of allowing the robot cleaner to stay in the specific area defined by the virtual wall requires a signal transmitter, such as the infrared transmitter, causing additional installation costs. Further, with this method, it is difficult to direct the robot cleaner to perfectly or repeatedly clean only the carpet area because the specific area is defined regardless of the material of a floor.

In addition, if the robot cleaner travels in a preset traveling pattern even in an area where the robot cleaner may be get stuck, such as a stepped area including a doorsill or stairway or carpet fringes, the robot cleaner may frequently fail to, complete a cleaning or docking operation. With regard to this problematic situation, if the robot cleaner is tangled with carpet fringes during traveling, a position of carpet fringes has been marked on a virtual map to prevent the robot cleaner from entering an area where the carpet fringes are present.

However, unconditionally marking an obstacle on a floor, such as the carpet fringes with which the robot cleaner is liable to be tangled during traveling, on the map to perform evasive traveling of the robot cleaner may make it impossible to clean the stepped area or the carpet area.

SUMMARY

Therefore, it is one aspect of the present disclosure to provide a robot cleaner and a control method thereof, in which a carpet mode to clean only a carpet area and an H/F mode to clean an H/F area excluding the carpet area are given based on detected information relating to the material of a floor (carpet or H/F), which enables partial cleaning with respect to a cleaning area selected by a user and adjustment in the number of cleaning operations (the number of traveling motions) or the intensity of cleaning according to the material of the floor.

It is another aspect of the present disclosure to provide a robot cleaner and a control method thereof, in which the robot cleaner is controlled based on detected information relating to the material or state of a floor (stepped area, carpet fringes, etc.) so as not to be rotated near the stepped area and the boundary of a carpet and an H/F where the robot cleaner may get stuck during traveling, but to move perpendicular to the stepped area or the boundary, which prevents the robot cleaner from failing to complete a cleaning or docking operation due to the presence of the stepped area or the boundary.

Additional aspects of the disclosure will be set forth in part in the description which follows and, in part, will be apparent from the description, or may be learned by practice of the disclosure.

In accordance with one aspect of the present disclosure, a robot cleaner includes a main brush to sweep or scatter dust off a floor, a main brush motor to rotate the main brush, a Revolution Per Minute (RPM) detector to detect an RPM of the main brush motor, and a control unit to determine a material or state of the floor according to the RPM of the main brush motor acquired by the RPM detector and control an operation of the robot cleaner based on the determined material or state of the floor.

The robot cleaner may further include an input unit to select a cleaning mode from among a carpet mode to clean only a carpet area, a hard floor mode to clean only a hard floor area and an auto mode to clean both the carpet area and the hard floor area, and the control unit may control a cleaning operation of the robot cleaner based on the cleaning mode input by the input unit.

The control unit may adjust the number of traveling motions of the robot cleaner or the RPM of the main brush motor based on the determined material of the floor.

The control unit may determine that the robot cleaner is traveling in the carpet area if the RPM of the main brush motor is less than a preset RPM and may determine that the robot cleaner is traveling in the hard floor area if the RPM of the main brush motor is greater than the preset RPM.

The control unit may determine that the robot cleaner passes a boundary between the carpet area and the hard floor area or a stepped area if rapid rising of the RPM of the main brush motor occurs.

The control unit may determine that the robot cleaner having passed through the hard floor area enters the carpet area if the RPM of the main brush motor is less than the previous RPM before rapid rising of the RPM of the main brush motor occurs.

The control unit may determine that the robot cleaner having passed through the carpet area enters the hard floor area if the RPM of the main brush motor is greater than the previous RPM before rapid rising of the RPM of the main brush motor occurs.

The robot cleaner may further include an upward camera unit to capture an upward image perpendicular to a traveling direction of the robot cleaner, and the control unit may produce a map with respect to a cleaning area using the upward image acquired by the upward camera unit during implementation of the cleaning operation and may mark the carpet area, the hard floor area, the boundary and the stepped area on the map.

The control unit may control the robot cleaner using the produced map so as to avoid the carpet area, the boundary or the stepped area when the robot cleaner returns to a docking station after completing the cleaning operation based on the cleaning mode.

The robot cleaner may further include a display unit to display that the robot cleaner is traveling in any one of the carpet area and the hard floor area.

In accordance with another aspect of the present disclosure, a robot cleaner includes a main brush to sweep or scatter dust off a floor, a main brush motor to rotate the main brush, a detector to detect driving information of the main brush motor, and a control unit to produce a map indicating a material or state of the floor according to the driving information of the main brush motor acquired by the detector.

The material of the floor may be sorted into a carpet and a hard floor, and a cleaning area may be sorted into a carpet area and a hard floor area.

The robot cleaner may further include an input unit to select a cleaning mode according to the material of the floor, and the control unit may control the robot cleaner so as to perform a cleaning operation with respect to an area, the material of the floor of which corresponds to the input cleaning mode.

The cleaning mode may include a carpet mode to clean only the carpet area, a hard floor mode to clean only the hard floor area and an auto mode to clean both the carpet area and the hard floor area.

The detector may be an RPM detector to detect an RPM of the main brush motor.

The control unit may determine that the robot cleaner is traveling in the carpet area if the RPM of the main brush motor is less than a preset RPM and may determine that the robot cleaner is traveling in the hard floor area if the RPM of the main brush motor is greater than the preset RPM.

The control unit may determine that the robot cleaner passes a boundary between the carpet area and the hard floor area or a stepped area if rapid rising of the RPM of the main brush motor occurs.

The control unit may determine that the robot cleaner having passed through the hard floor area enters the carpet area if the RPM of the main brush motor is less than the previous RPM before rapid rising of the RPM of the main brush motor occurs.

The control unit may determine that the robot cleaner having passed through the carpet area enters the hard floor area if the RPM of the main brush motor is greater than the previous RPM before rapid rising of the RPM of the main brush motor occurs.

The robot cleaner may further include an upward camera unit to capture an upward image perpendicular to a traveling direction of the robot cleaner, and the control unit may produce a map with respect to the cleaning area using the upward image acquired by the upward camera unit during implementation of the cleaning operation and may mark the carpet area, the hard floor area, the boundary and the stepped area on the map.

The control unit may control the robot cleaner using the produced map so as to avoid the carpet area, the boundary and the stepped area when the robot cleaner returns to a docking station after completing the cleaning operation based on the cleaning mode.

The detector may be a current detector to detect current passing through the main brush motor.

In accordance with a further aspect of the present disclosure, a control method of a robot cleaner includes inputting any one of a plurality of cleaning modes depending on materials of a floor, determining a material or state of the floor according to driving information of a main brush motor, and performing a cleaning operation on an area, the material of the floor of which corresponds to the input cleaning mode and simultaneously producing a map indicating the area, in which the cleaning operation is performed, and the determined material or state of the floor.

The material of the floor may be sorted into a carpet and a hard floor, and the cleaning area may be sorted into a carpet area and a hard floor area.

The plurality of cleaning modes may include a carpet mode to clean only the carpet area, a hard floor mode to clean only the hard floor area and an auto mode to clean both the carpet area and the hard floor area.

The driving information of the main brush motor may include an RPM of the main brush motor, and an area in which the robot cleaner is traveling may be marked as the carpet area on the map if the RPM of the main brush motor is less than a preset RPM and may be marked as the hard floor area on the map if the RPM of the main brush motor is greater than the preset RPM.

It may be determined that the robot cleaner passes a boundary between the carpet area and the hard floor area or a stepped area if rapid rising of the RPM of the main brush motor occurs, and an area in which the robot cleaner is passing may be marked as the boundary or the stepped area on the map.

The cleaning operation may be performed in such a manner that the number of traveling motions of the robot cleaner or the RPM of the main brush motor is adjusted according to the cleaning mode.

The control method may further include returning the robot cleaner to a docking station after completing the cleaning operation based on the cleaning mode, and the robot cleaner may travel to avoid the carpet area and the stepped area using the map while returning to the docking station.

The control method may further include returning the robot cleaner to a docking station after completing the cleaning operation based on the cleaning mode, and the robot cleaner may travel in a direction perpendicular to the boundary and the stepped area using the map while returning to the docking station.

The control method may further include displaying that the robot cleaner is traveling in any one of the carpet area and the hard floor area.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a control block diagram of the robot cleaner and the docking station in accordance with the embodiment of the present disclosure;

FIG. 7 is a view illustrating a map produced as a result of the robot cleaner performing an H/F mode and a return traveling path using the produced map in accordance with an embodiment of the present disclosure;

FIG. 8 is a view illustrating a map produced as a result of the robot cleaner performing an auto mode and a return traveling path using the produced map in accordance with an embodiment of the present disclosure;

FIG. 9 is a view explaining an operation in which the robot cleaner assumes a boundary line and moves perpendicular to the assumed boundary line in accordance with an embodiment of the present disclosure.

DETAILED DESCRIPTION

Figure 1:
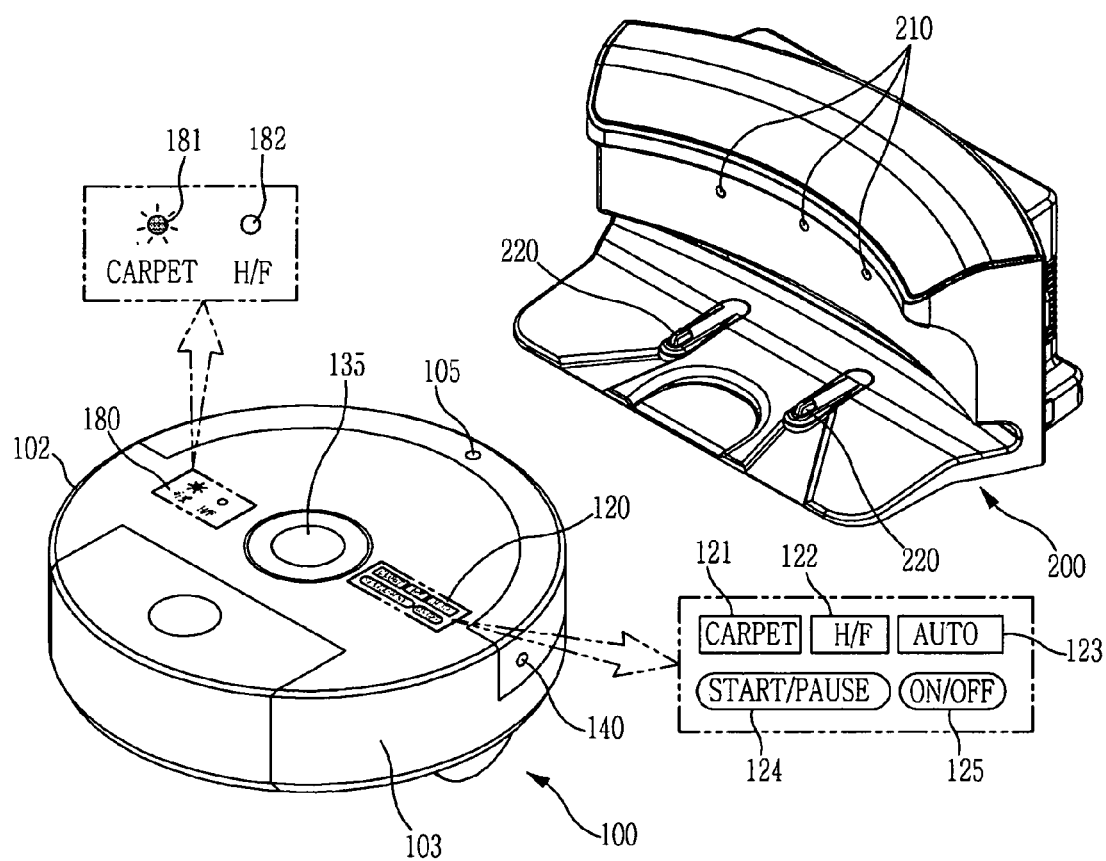
FIG. 1 is a perspective view illustrating configurations of a robot cleaner and a docking station in accordance with an embodiment of the present disclosure.

Reference will now be made in detail to the embodiments of the present disclosure, examples of which are illustrated in the accompanying drawings, wherein like reference numerals refer to like elements throughout.

FIG. 1 is a perspective view illustrating external configurations of a robot cleaner and a docking station in accordance with an embodiment of the present disclosure.

As illustrated in FIG. 1, the robot cleaner 100 in accordance with the embodiment of the present disclosure includes a main body 102 forming the external appearance of the robot cleaner 100. The main body 102 is provided at a front upper position thereof with a receiver 105, which receives an infrared signal or ultrasonic signal generated from transmitters 210 of a docking station 200 when the robot cleaner 100 returns to the docking station 200.

In addition, an input unit 120 including a plurality of buttons to input a cleaning or docking operation command, an upward camera unit 135 to capture an upward image perpendicular to a traveling direction and a display unit 180 to display information relating to operation of the robot cleaner 100 are arranged on the main body 102.

The input unit 120 includes the plurality of buttons, e.g., an ON/OFF button 125 to turn on or off power, a carpet mode button 121 to select a carpet mode to clean only a carpet area, an H/F mode button 122 to select an H/F mode to clean only an H/F area, an auto mode button 123 to select an auto mode to clean both the carpet area and the H/F area, and a start/pause button 124 to start or pause a cleaning or docking operation.

The display unit 180 includes a plurality of lights, e.g., a carpet area display light 181 to indicate that the robot cleaner 100 is cleaning (traveling) the carpet area and an H/F area display light 182 to indicate that the robot cleaner is cleaning (traveling) the H/F area. While the robot cleaner 100 passes a boundary between the carpet area and the H/F area, the carpet area display light 181 and the H/F area display light 182 are alternately turned on. In addition, the carpet area display light 181 and the H/F area display light 182 may be alternately turned on even while the robot cleaner 100 passes a stepped area, such as a doorsill or stairway.

A bumper 103 to absorb shock generated upon collision with an obstacle is attached to a front portion of the main body 102. An additional bumper 103 may further be attached to a rear portion of the main body 102. An obstacle detector 140 is provided near the bumper 103. The obstacle detector 140 is, for example, an ultrasonic sensor or an infrared sensor to sense an obstacle such as furniture and walls.

The docking station 200 includes the transmitters 210 and charging terminals 220. The transmitters 210 are arranged near a receptacle of the docking station 200 to transmit an infrared optical signal or ultrasonic signal so as to recognize that the robot cleaner 100 accesses the docking station 200. The charging terminals 220 supply power to a battery (see 115 in FIG. 2) of the robot cleaner 100 when electrically connected to connection terminals (see 110 in FIG. 2) of the robot cleaner 100.

Figure 2:
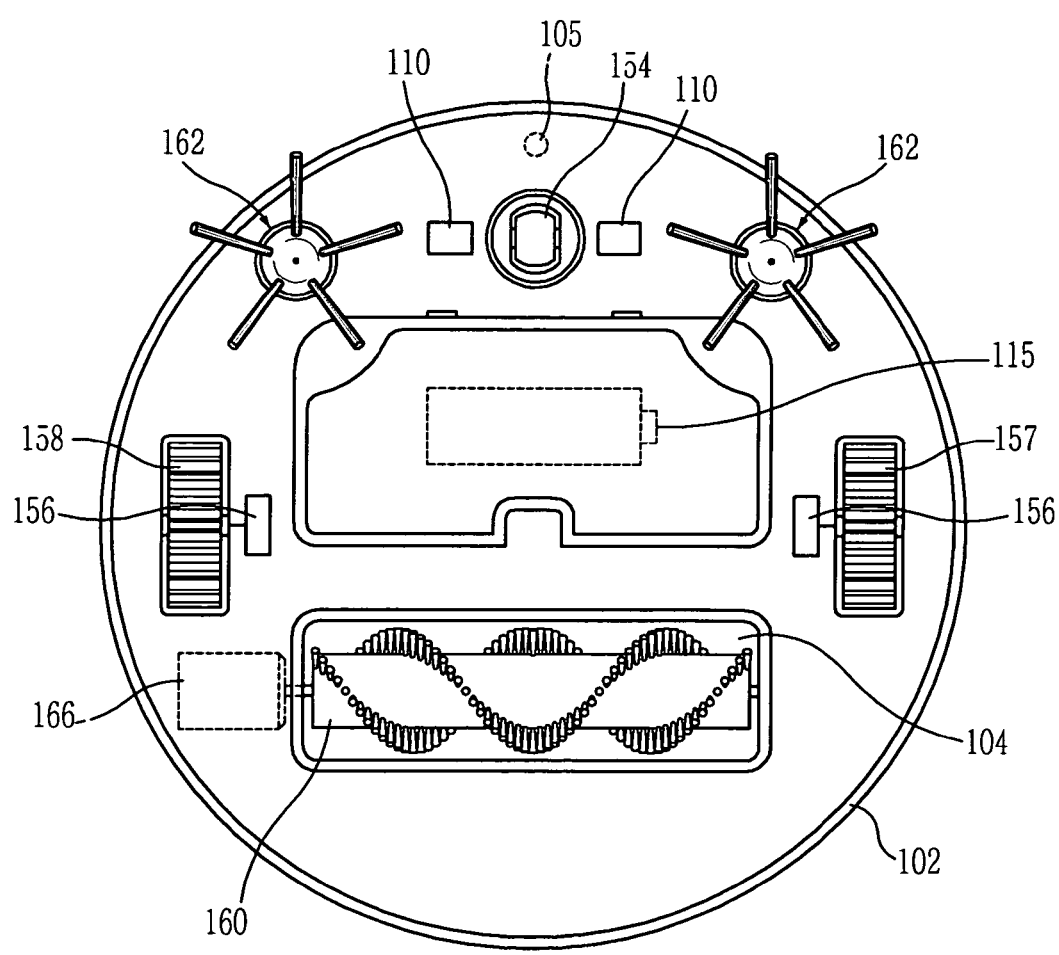
FIG. 2 is a bottom view of the robot cleaner in accordance with the embodiment of the present disclosure.

FIG. 2 is a bottom view of the robot cleaner in accordance with the embodiment of the present disclosure.

As illustrated in FIG. 2, the robot cleaner 100 includes elements 154, 156, 157 and 158 to move the robot cleaner 100, elements 160, 162 and 166 to sweep or scatter dust off a floor, and elements 110 and 115 to supply drive power to the robot cleaner 100.

The elements 154, 156, 157 and 158 to move the robot cleaner 100 include left and right wheels 157 and 158 arranged at opposite lateral positions of the main body 102 to enable forward and rearward movement and rotation of the robot cleaner 100, wheel motors 156 to transmit power to the respective wheels 157 and 158, and a caster wheel 154 arranged at a front position of the main body 102 and adapted to be rotated to change an orientation angle of the robot cleaner 100 according to the state of the floor on which the robot cleaner 100 travels.

The caster wheel 154 further functions to support the robot cleaner 100 to stabilize posture of the robot cleaner 100 and prevent the robot cleaner 100 from falling over. The caster wheel 154 takes the form of a roller or a caster.

The elements 160, 162 and 166 to sweep or scatter dust off the floor include a main brush 160 provided at a suction opening 104 perforated in the bottom of the main body 102, a main brush motor 166 to rotate the main brush 160, and side brushes 162 provided at front positions of a lower surface of the main body 102.

The main brush 160 sweeps or scatters dust off the floor below the main body 102, improving dust suction efficiency. The main brush 160 has a drum shape and consists of a roller and a brush.

The side brushes 162 sweep dust on the floor in front of the main body 102 and an area where the main brush 160 cannot reach toward the suction opening 104, improving dust suction efficiency.

The robot cleaner 100 further includes a dust collection unit (not shown) provided near the main brush 160 to collect foreign substances, such as dust, collected by the main brush 160. The robot cleaner 100 may collect foreign substances, such as dust, using suction force.

The elements 110 and 115 to supply drive power to the robot cleaner 100 include the battery 115 to supply drive power to the wheel motors 156, the main brush motor 166 and other drive units, and the connection terminals 110 electrically connected to the docking station 200 when the robot cleaner 100 docks with the docking station 200.

The battery 115 is a rechargeable secondary battery. The robot cleaner 100 is charged upon receiving power from the docking station 200 through the connection terminals 110.

FIG. 3 is a control block diagram of the robot cleaner and the docking station in accordance with the embodiment of the present disclosure.

The robot cleaner 100 includes the receiver 105, connection terminals 110, input unit 120, battery residue detector 130, upward camera unit 135, obstacle detector 140, control unit 145, storage unit 150, wheel drive unit 155, main brush drive unit 165, current detector 170, RPM detector 175 and display unit 180.

The receiver 105 receives an infrared optical signal or ultrasonic signal generated from the transmitters 210 of the docking station 200 and transmits information relating to the received signal to the control unit 145.

The connection terminals 110 are connected to the charging terminals 220 of the docking station 200 to supply power to the battery 115.

The input unit 120 includes the plurality of buttons arranged on the main body 102 of the robot cleaner 100 or a remote controller, to allow a user to input a cleaning command (e.g., operation start/pause command) or a charging (docking) command of the robot cleaner 100.

The battery residue detector 130 detects remaining power of the battery 115 and transmits information relating to the remaining power to the control unit 145.

The upward camera unit 135 is installed on the main body 102 to capture an upward image perpendicular to a traveling direction and transmits the captured image to the control unit 145. The upward camera unit 145 may be a charge coupled device (CCD) with a fish-eye lens.

The obstacle detector 140 senses an obstacle, such as furniture, office appliances and walls, present in a cleaning area where the robot cleaner 100 travels. The obstacle detector 140 may be an ultrasonic sensor, which senses the presence or absence of an obstacle and a distance from the obstacle by emitting ultrasonic waves to a path along which the robot cleaner 100 travels and receives the ultrasonic waves reflected from the obstacle, or may be an infrared sensor which includes a plurality of infrared light emitting elements to emit infrared light and infrared light receiving elements to receive the infrared light reflected from the obstacle.

The control unit 145 controls general operations of the robot cleaner 100. The control unit 145 determines the material or state of the floor according to Revolution Per Minute (RPM) of the main brush motor 166 obtained by the RPM detector 175 or a current value of the main brush motor 166 obtained by the current detector 170 and makes a map to indicate the material or state of the floor.

The control unit 145 receives any one of a plurality of cleaning modes (carpet mode, H/F mode and auto mode) according to the material of a floor from the input unit 120. Thereby, the control unit 145 controls the robot cleaner 100 so as to perform a cleaning operation only with respect to an area, the floor material of which corresponds to the input cleaning mode.

The storage unit 150 stores preset traveling patterns, maps for the entire cleaning area made during traveling of the robot cleaner 100, cleaning conditions according to cleaning modes (the number of traveling motions, RPM of the main brush motor, etc.).

The wheel drive unit 155 includes the wheel motors 156 to rotate and drive the left and right wheels 157 and 158 provided at the bottom of the main body 102. A rotation angle or traveling direction of the robot cleaner 100 is determined by differentiating RPM values of the respective wheel motors 156.

The main brush drive unit 165 includes the main brush motor 166 to rotate the main brush 160.

The current detector 170 detects current flowing through the main brush motor 166 and provides the control unit 145 with information relating to detected current.

The RPM detector 175 detects RPM of the main brush motor 166 and provides the control unit 145 with information relating to the detected RPM.

The display unit 180 displays operational information of the robot cleaner 100. In particular, the display unit 180 displays whether the robot cleaner 100 is traveling in the carpet area or the H/F area.

The transmitters 210 are installed near the receptacle of the docking station 200 and transmit an infrared optical signal or ultrasonic signal so as to recognize that the robot cleaner 100 accesses the docking station 200.

The charging terminals 220 are connected to an external power source (not shown) via a cable and supplies power to the battery 115 when electrically connected to the connection terminals 110 of the robot cleaner 100.

Figure 4A:
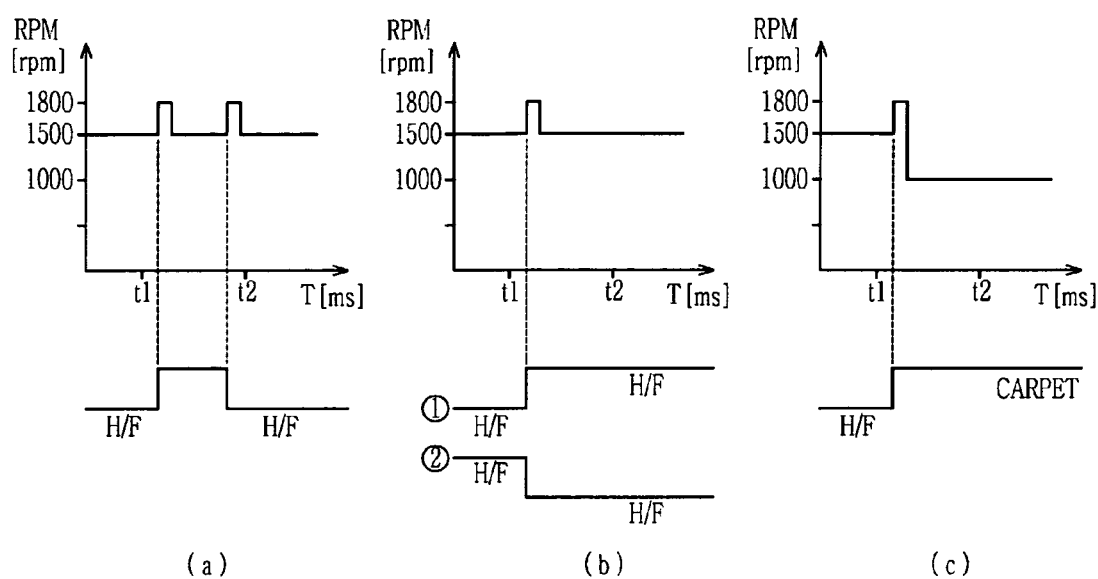
FIGS. 4A and 4B are graphs illustrating a relationship between the material/state of a floor and RPM of a main brush motor.
Figure 4B:
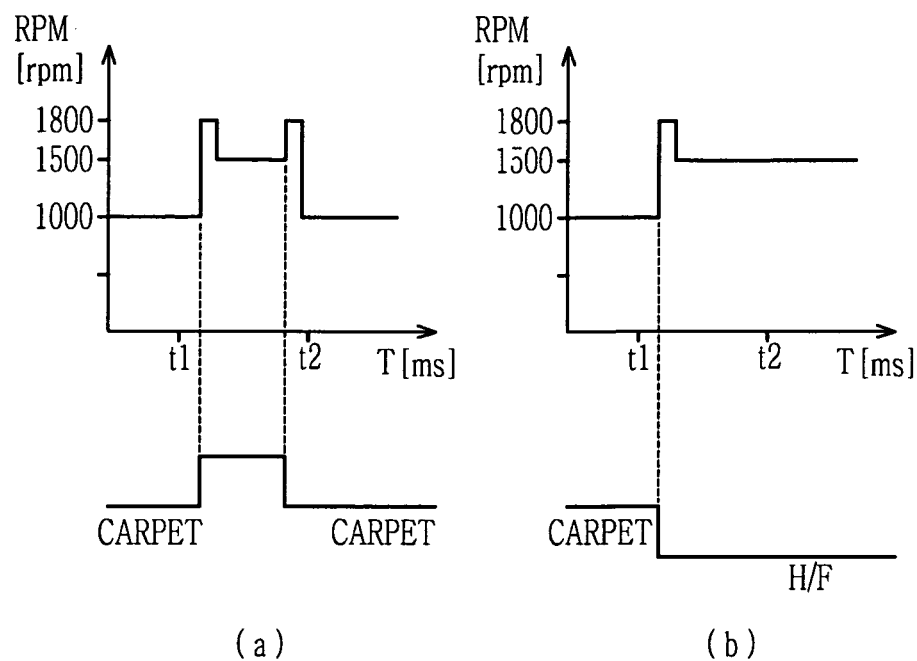

FIGS. 4A and 4B are graphs illustrating a relationship between the material/state of the floor and RPM of the main brush motor.

The main brush motor 166, which rotates the main brush 160 to sweep or scatter dust off the floor according to the material or state of the floor, is variable in RPM.

Generally, RPM of the main brush motor 166 is inversely proportional to the magnitude of load. Thus, RPM of the main brush motor 166 is highest in a state in which the main brush 160 of the robot cleaner 100 does not come into contact with the floor (e.g., the robot cleaner 100 is left between the floor and the stepped area such as a doorsill, stairway or thick carpet to enter the stepped area, or the robot cleaner 100 is overturned). Also, RPM of the main brush motor 166, in a state in which the robot cleaner 100 travels in the H/F area where load is reduced, is greater than RPM of the main brush motor 166 in a state in which the robot cleaner 100 travels in the carpet area where load is increased. Hereinafter, it is assumed that the main brush motor 166 operates at 1800 RPM when the robot cleaner 100 is located over the stepped area, at 1500 RPM when the robot cleaner 100 travels in the H/F area, and 1000 RPM when the robot cleaner 100 travels in the carpet area. A method of determining the material or state of the floor according to variation in RPM of the main brush motor 166 will now be described.

FIG. 4A is a graph illustrating variation in RPM of the main brush motor 166 when the robot cleaner 100 passes the stepped area, such as a doorsill or a stairway while traveling in the H/F area, or when the robot cleaner 100 travels the H/F area and then, enters the carpet area.

In the graph of FIG. 4A, part (a), RPM of the main brush motor 166 varies in the order of 1500 RPM→1800

RPM→1500 RPM→1800 RPM→1500 RPM. In this case, it will be appreciated that a time when RPM of the main brush motor 166 rapidly increases (rises) from 1500 RPM to 1800 RPM corresponds to a state in which the robot cleaner 100 having passed through the H/F area is left between the H/F area and the stepped area to enter the stepped area (to ascend the stepped area). In addition, it will be appreciated that a time interval for which RPM of the main brush motor 166 is reduced from 1800 RPM to 1500 RPM and is kept at 1500 RPM for a predetermined time corresponds to a state in which the robot cleaner 100 escapes from the H/F area and is passing the stepped area, such as a doorsill or stairway. In addition, it will be appreciated that RPM of the main brush motor 166 again rapidly increases from 1500 RPM to 1800 RPM corresponds to a state in which the robot cleaner 100 is left between the stepped area and the H/F area to escape from the stepped area such as a doorsill or stairway (to descend the stepped area). In conclusion, the graph of FIG. 4A, part (a), may be analyzed as illustrating variation in RPM of the main brush motor 166 when the robot cleaner 100 passes the stepped area having a predetermined width while traveling in the H/F area.

In the graph of FIG. 4A, part (b), RPM of the main brush motor 166 varies in the order of 1500 RPM→1800 RPM→1500 RPM. In this case, similar to the graph illustrated in FIG. 4A, part (a), it will be appreciated that the time when RPM of the main brush motor 166 rapidly increases from 1500 RPM to 1800 RPM corresponds to the state in which the robot cleaner 100 is left between the H/F area and the stepped area, such as a doorsill or stairway, to enter the stepped area (to ascend the stepped area). However, differently from the graph of FIG. 4A, part (a), the graph of FIG. 4A, part (b), does not contain the time interval for which RPM of the main brush motor 166 is reduced from 1800 RPM to 1500 RPM and is kept at 1500 RPM for the predetermined time and the time when RPM of the main brush motor 166 again rapidly increases from 1500 RPM to 1800 RPM. More specifically, the graph of FIG. 4A, part (b), may be analyzed as illustrating variation in RPM of the main brush motor 166 when the robot cleaner 100 enters a cleaning area in which the stepped area is present (i.e. a cleaning area, the height of the floor is irregular). The graph of FIG. 4A, part (b), illustrates variation in RPM of the main brush motor 155 in both a case in which the robot cleaner 100 ascends from one H/F area to another H/F area having a higher height as represented by reference symbol ① and a case in which the robot cleaner 100 descends from one H/F area to another H/F area having a lower height as represented by reference symbol ②.

In the graph of FIG. 4A, part (c), RPM of the main brush motor 166 varies in the order of 1500 RPM→1800 RPM→1000 RPM. In this case, similar to the graphs illustrated in FIGS. 4A, part (a), and 4A, part (b), it will be appreciated that the time when RPM of the main brush motor 166 rapidly increases from 1500 RPM to 1800 RPM corresponds to the state in which the robot cleaner 100 is left between the H/F area and the stepped area, such as a doorsill or stairway, to enter the stepped area (to ascend the stepped area). However, differently from the graph of FIG. 4A, part (b), in which RPM of the main brush motor 166 is reduced from 1800 RPM to 1500 RPM and is kept at 1500 RPM, the graph of FIG. 4A, part (c), illustrates that RPM of the main brush motor 166 is reduced from 1800 RPM to 1000 RPM and is kept at 1000 RPM. That is to say, the graph of FIG. 4A, part (c), may be analyzed as illustrating variation in RPM of the main brush motor 166 when the robot cleaner 100 enters the carpet area where the thick carpet is spread.

During actual cleaning of the robot cleaner 100, the robot cleaner 100 frequently undergoes a situation in which the robot cleaner 100 passes the stepped area (e.g., doorsill) having a predetermined width while traveling in the H/F area as illustrated in FIG. 4A, part (a), and a situation in which the robot cleaner 100 having passed through the H/F area enters the carpet area where the thick carpet is spread as illustrated in FIG. 4A, part (c). In this case, to distinguish the aforementioned two situations based on variation in RPM of the main brush motor 166, RPM of the main brush motor 166 at a time t1 before RPM of the main brush motor 166 rapidly increases from 1500 RPM to 1800 RPM is compared with RPM of the main brush motor 166 at a time t2 after the robot cleaner 100 passes the stepped area having a predetermined width and then, RPM of the main brush motor 166 again rapidly increases from 1500 RPM to 1800 RPM. That is to say, the situation in which the robot cleaner 100 passes the stepped area having a predetermined width is determined if RPM of the main brush motor 166 at the time t1 is equal to is RPM of the main brush motor 166 at the time t2. Also, the situation in which the robot cleaner having passed through the H/F area enters the carpet area where the thick carpet increasing load is spread is determined if RPM of the main brush motor 166 at the time t2 is less than RPM of the main brush motor 166 at the time t1.

FIG. 4B is a graph illustrating variation in RPM of the main brush motor 166 when the robot cleaner 100 passes the stepped area while traveling in the carpet area, or when the robot cleaner 100 travels the carpet area and then, enters the H/F area.

In the graph of FIG. 4B, part (a), RPM of the main brush motor 166 varies in the order of 1000 RPM→1800 RPM→1500 RPM→1800 RPM→1000 RPM. In this case, it will be appreciated that a time when RPM of the main brush motor 166 rapidly increases (rises) from 1000 RPM to 1800 RPM corresponds to a state in which the robot cleaner 100 having passed through the carpet area is left between the carpet area and the stepped area to enter the stepped area (to ascend the stepped area). In addition, it will be appreciated that a time interval for which RPM of the main brush motor 166 is reduced from 1800 RPM to 1500 RPM and is kept at 1500 RPM for a predetermined time corresponds to a state in which the robot cleaner 100 escapes from the carpet area and is passing the stepped area (made of a hard material). In addition, it will be appreciated that RPM of the main brush motor 166 again rapidly increases from 1500 RPM to 1800 RPM corresponds to a state in which the robot cleaner 100 is left between the stepped area and the carpet area to escape from the stepped area (to descend the stepped area). In conclusion, the graph of FIG. 4B, part (a), may be analyzed as illustrating variation in RPM of the main brush motor 166 when the robot cleaner 100 passes the stepped area having a predetermined width while traveling in the carpet area.

In the graph of FIG. 4B, part (b), RPM of the main brush motor 166 varies in the order of 1000 RPM→1800 RPM→1500 RPM. In this case, similar to the graph illustrated in FIG. 4B, part (a), it will be appreciated that the time when RPM of the main brush motor 166 rapidly increases from 1000 RPM to 1800 RPM corresponds to the state in which the robot cleaner 100 is left between the carpet area and the stepped area to enter the stepped area (to ascend the stepped area). However, differently from the graph of FIG. 4B, part (a), the graph of FIG. 4B, part (b), illustrates that RPM of the main brush motor 166 rapidly increases from 1000 RPM to 1800 RPM and then, is reduced to and kept at 1500 RPM. That is to say, the graph of FIG. 4B, part (b) may be analyzed as illustrating variation in RPM of the main brush motor 166 when the robot cleaner 100 having passed through the carpet area enters the H/F area. In this case, to distinguish the aforementioned two situations of FIGS. 4B, part (a), and 4B, part (b), based on variation in RPM of the main brush motor 166, RPM of the main brush motor 166 at a time t1 before RPM of the main brush motor 166 rapidly increases from 1000 RPM to 1800 RPM is compared with RPM of the main brush motor 166 at a time t2 after the robot cleaner 100 passes the stepped area having a predetermined width and then, RPM of the main brush motor 166 again rapidly increases from 1500 RPM to 1800 RPM. That is to say, the situation in which the robot cleaner 100 passes the stepped area having a predetermined width is determined if RPM of the main brush motor 166 at the time t1 is equal to is RPM of the main brush motor 166 at the time t2. Also, the situation in which the robot cleaner having passed through the carpet area enters the H/F where load is reduced is determined if RPM of the main brush motor 166 at the time t2 is greater than RPM of the main brush motor 166 at the time t1.

Hereinafter, maps produced as a result of the robot cleaner in accordance with the embodiment of the present disclosure performing the carpet mode, H/F mode and auto mode respectively and a method of searching a return traveling path of the robot cleaner to the docking station using the maps will be described with reference to FIGS. 5 to 8.

Figure 5:
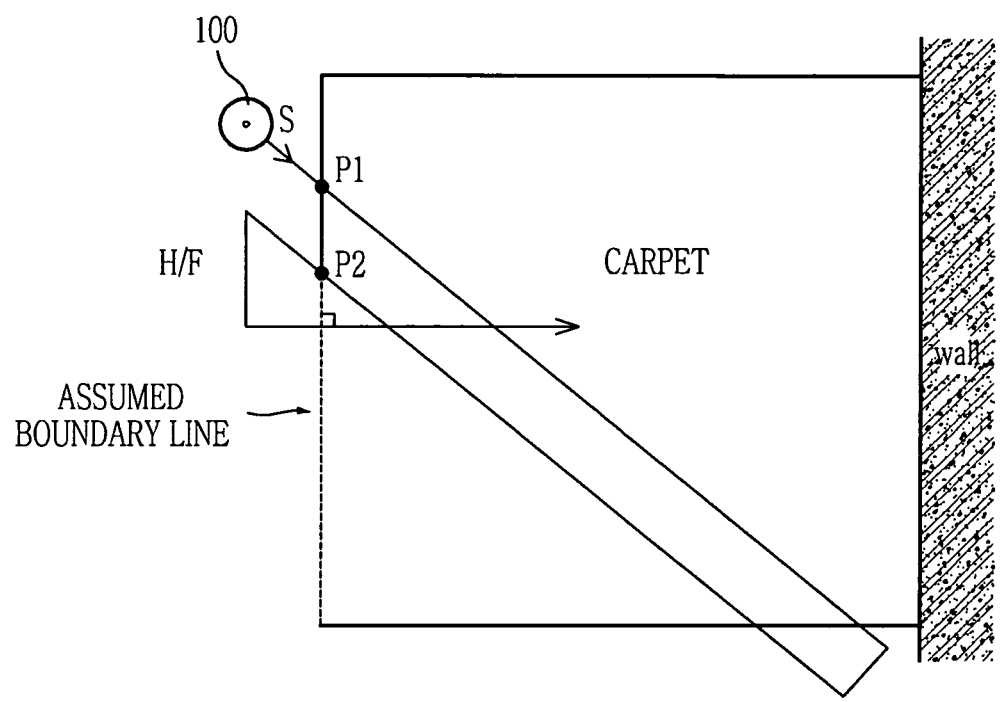
FIG. 5 is a view illustrating an example of a cleaning area in which all of a carpet area, an H/F area and a stepped area are present.

FIG. 5 is a view illustrating an example of a cleaning area in which all the carpet area, H/F area and stepped area are present.

One carpet area and one H/F area are found in the entire cleaning area illustrated in FIG. 5. Here, the H/F area contains a doorsill as an example of the stepped area and one obstacle and the docking station 200 is located near the H/F area. In the exemplified situation, the carpet area also contains one obstacle. In addition, it is assumed that the cleaning area is entirely enclosed by walls. Maps and return traveling paths illustrated in FIGS. 6 to 8 which will be described hereinafter are given based on the entire cleaning area illustrated in FIG. 5.

Figure 6:
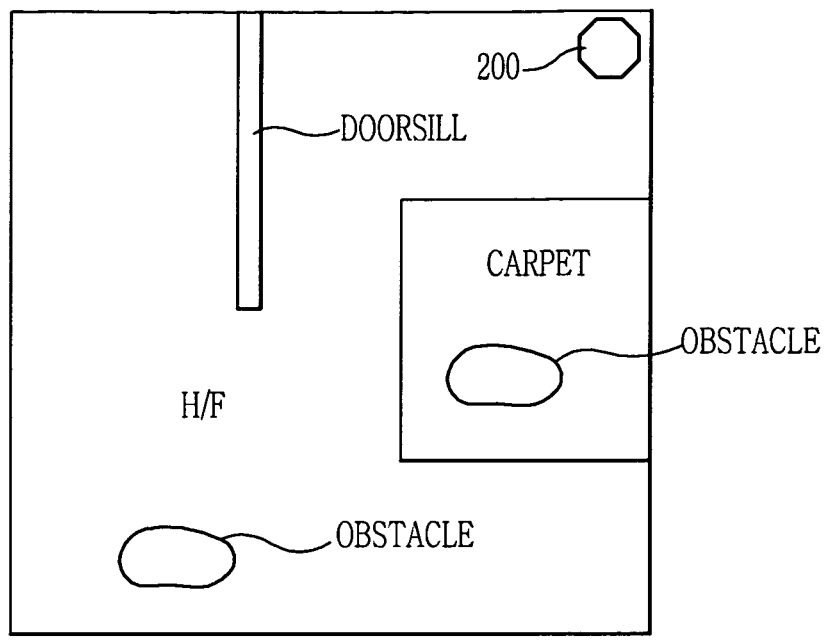
FIG. 6 is a view illustrating a map produced as a result of the robot cleaner performing a carpet mode and a return traveling path using the produced map in accordance with an embodiment of the present disclosure.

If the robot cleaner 100 completes the carpet mode to clean only the carpet area, a map with respect to the entire cleaning area as illustrated in FIG. 6, part (a), is produced. When the robot cleaner 100, which begins to travel (clean) at a location S, passes the boundary between the H/F area and the carpet area, the control unit 145 recognizes the boundary between the H/F area and the carpet area by analyzing variation in RPM of the main brush motor 166. In this case, the control unit 145 marks boundary positions as square points on the map when the robot cleaner 100 passes the boundary. More specifically, to perform the carpet mode to clean only the carpet area, the control unit 145 controls the robot cleaner 100 so as to perform a cleaning operation while the robot cleaner 100 travels only in the carpet area, i.e. in a state in which RPM of the main brush motor 166 is kept at, e.g., 1000 RPM. The control unit 145 marks a boundary position as a square point on the map whenever the robot cleaner 100 passes the boundary during cleaning, thereby producing a boundary line L2 as a combination of square points after completion of the carpet mode. In addition, the control unit 145 detects an obstacle, such as furniture or walls, using information detected by the obstacle detector 140 and marks a detected position as a circular point on the map whenever the obstacle is detected, thereby producing an obstacle line L1 as a combination of circular points after completion of the carpet mode.

The carpet mode as clarified in the present embodiment is completed if the boundary line L2 marked on the map defines a closed loop, or the boundary line L2 and the obstacle line L1 marked on the map are combined with each other to define a closed loop. Consequently, once the carpet mode is completed, as illustrated in FIG. 6, part (a), the map with respect to the entire cleaning area is provided with the boundary line L2 corresponding to the boundary between the H/F area and the carpet area and the obstacle line L1 with respect to only the obstacle present in the carpet area. A cleaned area with respect to only the carpet area is marked by oblique lines on the map. The control unit 145 may also mark an area, where RPM of the main brush motor 166 is kept at, e.g., 1000 RPM while the robot cleaner 100 travels in the carpet area, as the carpet area on the map.

The robot cleaner 100 begins a return (docking) operation to the docking station 200 after completing the carpet mode. Since the carpet area increases traveling load, the robot cleaner 100 may advantageously avoid the carpet area as much as possible, which minimizes power consumption. Since the boundary line L2 corresponding to the boundary and the cleaned carpet area are marked after completion of the carpet mode, the control unit 145 may search for a path to allow the robot cleaner 100 to avoid the carpet area. For example, as illustrated in FIG. 6, part (b), if the robot cleaner 100 completes the carpet mode and then, ends to travel (clean) at a location E, under control of the control unit 145, the robot cleaner 100 travels along the path (represented by a thick solid line) to avoid the carpet area.

If the robot cleaner 100 completes the H/F mode to clean only the H/F area, a map with respect to the entire cleaning area as illustrated in FIG. 7, part (a), is produced. When the robot cleaner 100, which begins to travel (clean) at a location S, passes the boundary between the H/F area and the carpet area, the control unit 145 recognizes the boundary between the H/F area and the carpet area by analyzing variation in RPM of the main brush motor 166. In this case, the control unit 145 marks boundary positions as square points on the map when the robot cleaner 100 passes the boundary. More specifically, to perform the H/F mode to clean only the H/F area, the control unit 145 controls the robot cleaner 100 so as to perform a cleaning operation while the robot cleaner 100 travels only in the H/F area, i.e. in a state in which RPM of the main brush motor 166 is kept at, e.g., 1500 RPM. The control unit 145 marks a boundary position as a square point on the map whenever the robot cleaner 100 passes the boundary during cleaning, thereby producing the boundary line L2 as a combination of square points after completion of the H/F mode. In addition, the control unit 145 recognizes the stepped area (e.g., a doorsill) having a predetermined width by analyzing variation in RPM of the main brush motor 166 and marks a detected position as a triangular point on the map whenever the robot cleaner 100 passes the stepped area during cleaning, thereby producing a stepped area line L3 as a combination of triangular points after completion of the H/F mode. Also, the control unit 145 detects an obstacle, such as furniture or walls, using information detected by the obstacle detector 140 and marks a detected position as a circular point on the map whenever the obstacle is detected, thereby producing an obstacle line L1 as a combination of circular points after completion of the H/F mode.

The H/F mode as clarified in the present embodiment is completed if the boundary line L2 and the obstacle line L1 marked on the map are combined with each other to define a closed loop. Consequently, once the H/F mode is completed, as illustrated in FIG. 7, part (a), the map with respect to the entire cleaning area is provided with the boundary line L2 corresponding to the boundary between the H/F area and the carpet area, the stepped area line L3 corresponding to the stepped area such as a doorsill, and the obstacle line L1 with respect to only the obstacle present in the H/F area. A cleaned area with respect to only the H/F area is marked by oblique lines on the map. The control unit 145 may also mark an area, where RPM of the main brush motor 166 is kept at, e.g., 1500 RPM while the robot cleaner 100 travels in the H/F area, as the H/F area on the map.

The robot cleaner 100 begins a return (docking) operation to the docking station 200 after completing the H/F mode. Since the carpet area increases traveling load, the robot cleaner 100 may advantageously avoid the carpet area as much as possible, which minimizes power consumption. Since the boundary line L2 corresponding to the boundary and the cleaned H/F area are marked after completion of the H/F mode, the control unit 145 may search for a path to allow the robot cleaner 100 to avoid the carpet area. For example, as illustrated in FIG. 7(b), if the robot cleaner 100 completes the H/F mode and then, ends to travel (clean) at a location E, under control of the control unit 145, the robot cleaner 100 travels along the path (represented by a thick solid line) to avoid the carpet area, stepped area and obstacle.

If the robot cleaner 100 completes the auto mode to clean both the carpet area and the H/F area, a map with respect to the entire cleaning area as illustrated in FIG. 8, part (a), is produced. When the robot cleaner 100 begins to travel (clean) at a location S and enters the boundary between the H/F area and the carpet area, the control unit 145 recognizes the boundary between the H/F area and the carpet area by analyzing variation in RPM of the main brush motor 166. In this case, the control unit 145 marks a boundary position as a square point on the map when the robot cleaner 100 passes the boundary.

To perform the auto mode to clean both the carpet area and the H/F area, the control unit 145 controls a cleaning operation based on preset conditions (the number of traveling motions and the intensity of cleaning) with respect to the respective areas. For example, the control unit 145 enhances cleaning effects of a cleaning operation using a traveling pattern such that the robot cleaner 100 reciprocates the carpet area twice during cleaning or by increasing RPM of the main brush motor 166 with respect to the carpet area generating a great quantity of dust, or controls a cleaning operation using a traveling pattern such that the robot cleaner 100 reciprocates the carpet area once during cleaning or by reducing RPM of the main brush motor 166 with respect to the H/F area generating a relatively small quantity of dust.

The control unit 145 marks a boundary position as a square point on the map whenever the robot cleaner 100 passes the boundary during cleaning, thereby producing a boundary line L2 as a combination of square points after completion of the auto mode. In addition, the control unit 145 recognizes the stepped area (e.g., a doorsill) having a predetermined width by analyzing variation in RPM of the main brush motor 166 and marks a detected position as a triangular point on the map whenever the robot cleaner 100 passes the stepped area during cleaning, thereby producing a stepped area line L3 as a combination of triangular points after completion of the auto mode. Also, the control unit 145 detects an obstacle, such as furniture or walls, using information detected by the obstacle detector 140 and marks a detected position as a circular point on the map whenever the obstacle is detected, thereby producing an obstacle line L1 as a combination of circular points after completion of the auto mode.

Once the auto mode as clarified in the present embodiment is completed, as illustrated in FIG. 8, part (a), the map with respect to the entire cleaning area is provided with the boundary line L2 corresponding to the boundary between the H/F area and the carpet area, the stepped area line L3 corresponding to the stepped area such as a doorsill, and the obstacle lines L1 with respect to the obstacles present in the H/F area and the carpet area. A cleaned area with respect to the entire cleaning area is marked by oblique lines on the map. The control unit 145 may mark respective areas using different methods (e.g., different colors). For example, an area where RPM of the main brush motor 166 is kept at, e.g., 1000 RPM while the robot cleaner 100 travels in the H/F area and an area where RPM of the main brush motor 166 is kept at, e.g., 1500 RPM while the robot cleaner 100 travels in the H/F area may be differently marked on the map.

The robot cleaner 100 begins a return (docking) operation to the docking station 200 after completing the auto mode. Since the carpet area increases traveling load, the robot cleaner 100 may advantageously avoid the carpet area as much as possible, which minimizes power consumption. Since the boundary line L2 corresponding to the boundary and the cleaned carpet area are marked after completion of the auto mode, the control unit 145 may search for a path to allow the robot cleaner 100 to avoid the carpet area. For example, as illustrated in FIG. 8, part (b), if the robot cleaner 100 completes the auto mode and then, ends to travel (clean) at a location E, under control of the control unit 145, the robot cleaner 100 travels along the path (represented by a thick solid line) to avoid the carpet area, stepped area and obstacle.

FIG. 9 is a view explaining an operation in which the robot cleaner assumes the boundary line and moves perpendicular to the assumed boundary line in accordance with an embodiment of the present disclosure.

In FIG. 9, a case in which the robot cleaner 100 travels in a zigzag pattern is illustrated. When the robot cleaner 100 beings to travel (clean) at a location S and passes the boundary (a point P1) between the H/F area and the carpet area, the control unit 145 recognizes the boundary between the H/F area and the carpet area by analyzing variation in RPM of the main brush motor 166. In this case, the control unit 145 marks the boundary point P1 on a map when the robot cleaner 100 passes the boundary. When the robot cleaner 100 having passed the point P1 travels in a zigzag pattern and then, again passes the boundary (a point P2) between the H/F area and the carpet area, the control unit 145 recognizes the boundary between the H/F area and the carpet area by analyzing variation in RPM of the main brush motor 166. In this case, the control unit 145 marks the boundary point P2 on the map when the robot cleaner 100 passes the boundary. As such, the control unit 145 recognizes the boundary points P1 and P2 between the H/F area and the carpet area while the robot cleaner 100 travels in a zigzag pattern, and assumes a straight line (represented by a dotted line in FIG. 9) as an extension of the points P1 and P2 as the boundary line between the H/F area and the carpet area. The control unit 145 controls the robot cleaner 100 having passed through the point P2 so as to travel in a direction perpendicular to the assumed boundary line. In addition, the control unit 145 prevents the robot cleaner 100 from rotating near the assumed boundary line if possible. This may prevent the robot cleaner 100 from stopping a cleaning (or docking) operation by being tangled with, e.g., carpet fringes when passing the boundary between the H/F area and the carpet area.

Although the method of assuming the boundary line when the robot cleaner 100 passes the boundary between the H/F area and the carpet area has been described with reference to FIG. 9, the stepped area line may be assumed similar to the above described method even when the robot cleaner 100 passes the stepped region such as a doorsill or stairway.

Figure 10A:
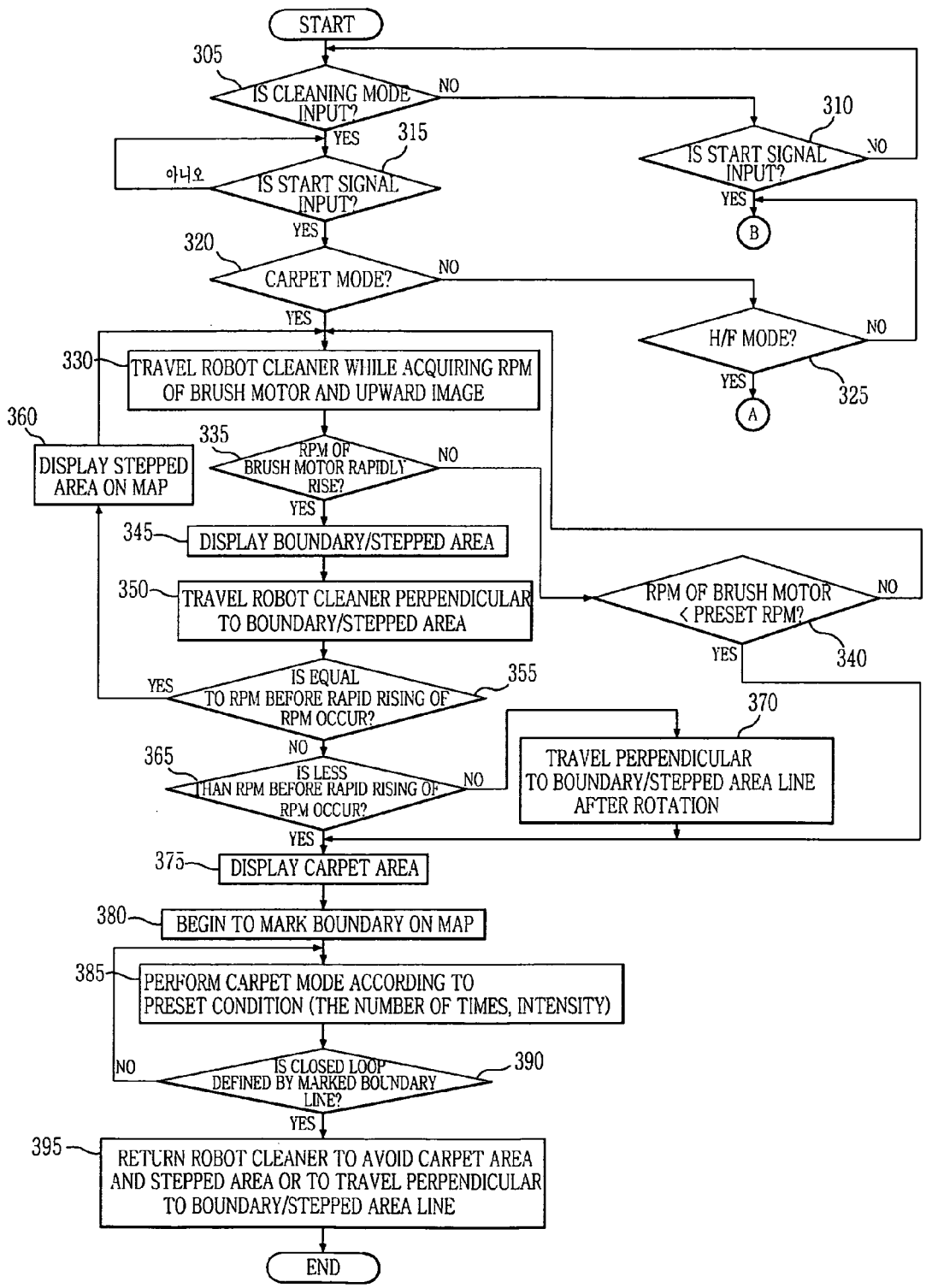
FIGS. 10A to 10C are flowcharts illustrating a control method of the robot cleaner in accordance with an embodiment of the present disclosure.
Figure 10B:
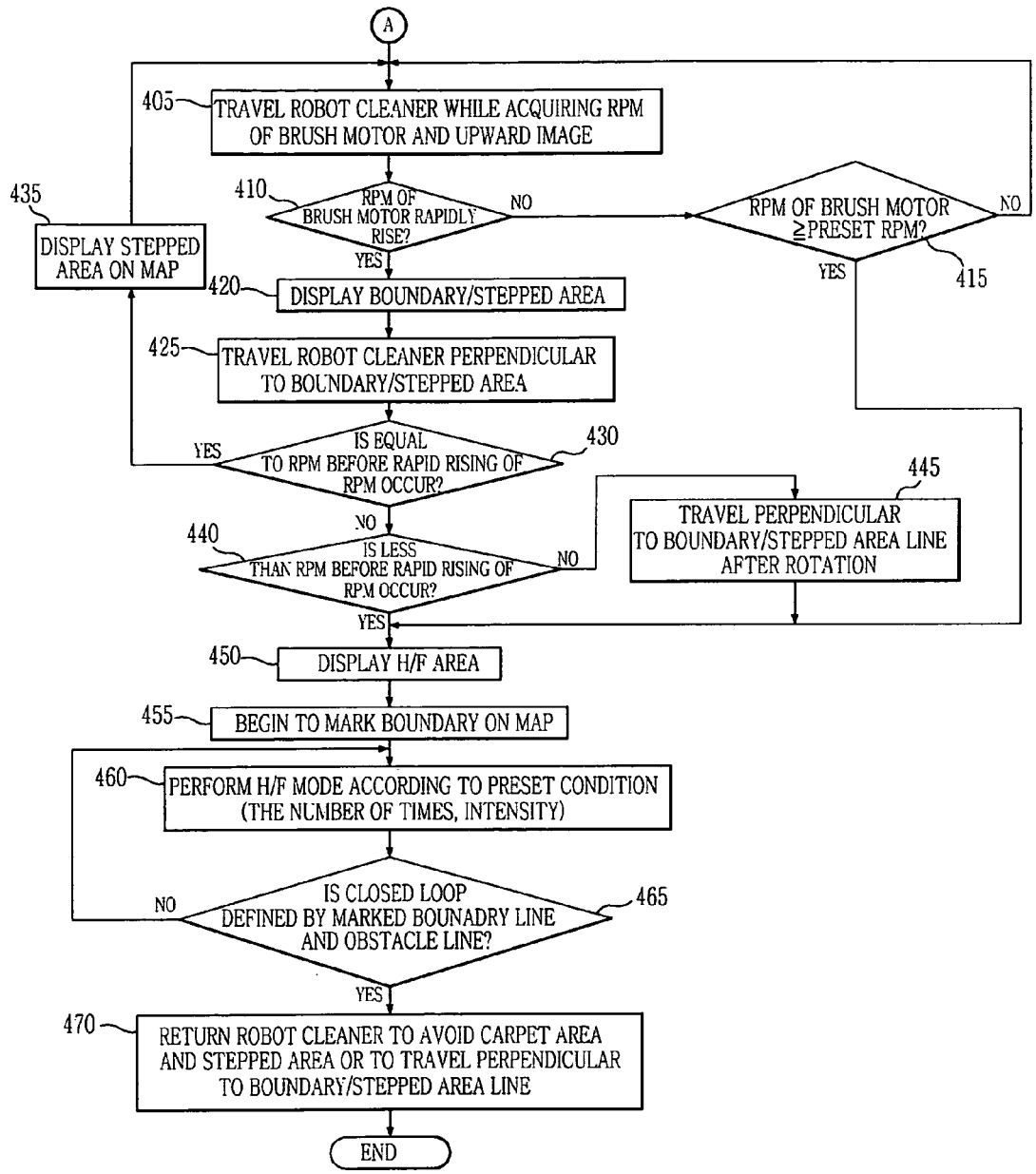
Figure 10C:
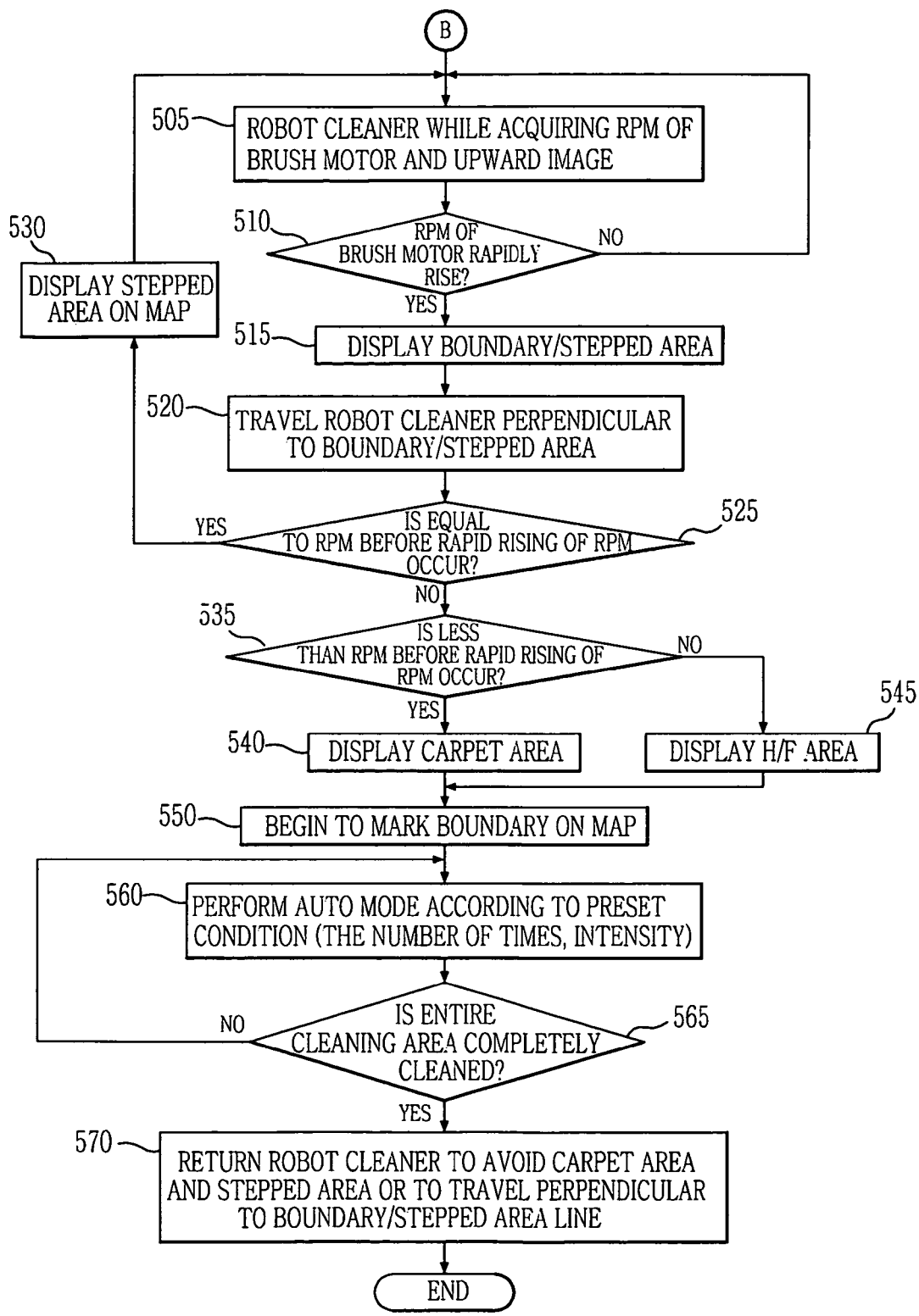

FIGS. 10A to 10C are flowcharts illustrating a control method of the robot cleaner in accordance with an embodiment of the present disclosure.

It is assumed as initial conditions for explanation of an operation in accordance with the present embodiment that the storage unit 150 of the robot cleaner 100 stores, e.g., preset traveling patterns and preset conditions (the number of traveling motions and the intensity of cleaning) according to different cleaning modes (carpet mode, H/F mode and auto mode).

First, the control unit 145 determines whether a cleaning mode command signal is input from the input unit 120 (305). If the cleaning mode command signal is not input ('NO' in operation 305), the control unit 145 determines whether a start signal is input from the input unit 120 (310). If the cleaning mode command signal is not input ('NO' in operation 305) and only the start signal is input ('YES' in operation 310), the control unit 145 determines that a user desires to clean the entire cleaning area and proceeds to operation B so as to perform the auto mode. The operation to perform the auto mode will be described later in detail with reference to FIG. 10C.

If the cleaning mode command signal is input ('YES' in operation 305), the control unit 145 determines that the start signal is input from the input unit 120 (315).

If the start signal is input ('YES' in operation 315), the control unit 145 determines whether the input cleaning mode command signal is the carpet mode or not (320). If the carpet mode is not input ('NO' in operation 320), the control unit 145 determines whether the input cleaning mode command signal is the H/F mode or not (325). If the H/F mode is input ('YES' in operation 325), the control unit 145 proceeds to operation A to perform the H/F mode. The operation to perform the H/F mode will be described later in detail with reference to FIG. 10B.

If the H/F mode is not input ('NO' in operation 325), the control unit 145 proceeds to operation B to perform the auto mode.

If the control unit 145 returns to operation 320 and the carpet mode is determined in operation 320 ('YES' in operation 320), the control unit 145 acquires an RPM value of the main brush motor 166 from the RPM detector 175 and also, acquires an upward image perpendicular to a traveling direction from the upward camera unit 135, thereby controlling the robot cleaner 100 so as to travel in a preset traveling pattern (330). The control unit 145 produces a map with respect to a cleaning area using the upward image acquired by the upward camera unit 135 during implementation of a cleaning operation.

Thereafter, the control unit 145 determines whether RPM of the main brush motor 166 rapidly rises (335). If RPM of the main brush motor 166 does not rapidly rise, the control unit 145 determines whether RPM of the main brush motor 166 is less than a preset RPM (a reference RPM to distinguish the carpet area and the H/F area from each other, e.g., 1400 RPM) (340). If RPM of the main brush motor 166 is not less than the preset RPM ('NO' in operation 340), the control unit 145 determines that the robot cleaner 100 is traveling in the H/F area and returns to operation 330 to allow the robot cleaner 100 to continuously travel in the preset traveling pattern.

On the other hand, if RPM of the main brush motor 166 rapidly rises ('YES' in operation 335), the control unit 145 determines that the robot cleaner 100 is passing the boundary between the carpet area and the H/F area or the stepped area. Thereby, under control of the control unit 145, the carpet area display light 181 and the H/F area display light 182 of the display unit 180 are alternately turned on (345).

Next, the control unit 145 assumes the boundary line or the stepped area line and controls the robot cleaner 100 so as to travel in a direction perpendicular to the assumed boundary line or stepped area line (350). In this case, as mentioned in the above description of FIG. 9, the boundary line or stepped area line may be assumed after the robot cleaner 100 passes the boundary between the H/F area and the carpet area or the stepped area plural times (in FIG. 9, after passing the boundary twice, i.e. after passing the points P1 and P2). Thereby, under control of the control unit 145, the robot cleaner 100 travels in a direction perpendicular to the assumed boundary line or stepped area line.

Thereafter, the control unit 145 determines whether RPM of the main brush motor 166 is equal to the previous RPM before rapid rising of RPM occurs (355). If RPM of the main brush motor 166 is equal to the previous RPM before rapid rising of RPM occurs ('YES' in operation 355), the control unit 145 determines that the robot cleaner 100 passes the stepped area and marks the stepped area (position) on the map (360) and then, returns to operation 330 so as to allow the robot cleaner to continuously travel in the preset traveling pattern.

On the other hand, if RPM of the main brush motor 166 is not equal to the previous RPM before rapid rising of RPM occurs ('NO' in operation 355), the control unit 145 determines whether RPM of the main brush motor 166 is less than the previous RPM before rapid rising of RPM occurs (365).

If RPM of the main brush motor 166 is not less than the previous RPM before rapid rising of RPM occurs ('NO' in operation 365), the control unit 145 determines that the robot cleaner 100 is moving from the carpet area to the H/F area. Thereby, under control of the control unit 145, the robot cleaner 100 is rotated to an introduction direction of the carpet area so as to travel in a direction perpendicular to the assumed boundary line or stepped area line (370).

On the other hand, if RPM of the main brush motor 166 is less than the previous RPM before rapid rising of RPM occurs ('YES' in operation 365), the control unit 145 determines that the robot cleaner 100 is moving from the H/F area to the carpet area. Thereby, under control of the control unit 145, the carpet area display light 181 of the display unit 180 is turned on so as to indicate that the robot cleaner 100 travels in the carpet area (375).

Next, the control unit 145 begins to mark the boundary (position) on the map that is being made (380). Thereafter, the control unit 145 controls implementation of the carpet mode according to preset conditions (the number of traveling motions and the intensity of cleaning) (385). Thereby, the control unit 145 controls the robot cleaner 100 traveling in the carpet area so as to perform a cleaning operation only in an area where the main brush motor 166 operates at, e.g., 1000 RPM. Also, the control unit 145 recognizes the boundary and the stepped area by analyzing variation in RPM of the main brush motor 166 during implementation of the carpet mode and marks the boundary line L2 and the stepped area line L3 on the map. In addition, the control unit 145 assumes the boundary line or stepped area line and travels the robot cleaner 100 so as to travel in a direction perpendicular to the assumed boundary line or stepped area line.

Thereafter, the control unit 145 determines whether the boundary line L2 marked on the map defines a closed loop or a combination of the boundary line L2 and the obstacle line L1 marked on the map defines a closed loop (390). If the boundary line L2 and the obstacle line L1 marked on the map do not define a closed loop ('NO' in operation 390), the control unit 145 returns to operation 385 to allow the robot cleaner 100 to continuously perform the carpet mode based on preset conditions.

On the other hand, if the boundary line L2 and the obstacle line L1 marked on the map define the closed loop ('YES' in operation 390), the control unit 145 determines that the carpet mode is completed and begins a return (traveling) operation to the charging station 200. Thereby, the control unit 145 controls the robot cleaner 100 so as to return to the charging station 200 by traveling to avoid the carpet area and the stepped area line L3 using the produced map or by traveling in a direction perpendicular to the boundary line L2 and the stepped area line L3 marked on the map. Here, the best way to return to the charging station 200 is to avoid the carpet area where traveling load is increased or the stepped area where the robot cleaner 100 may get stuck. However, if it is difficult to avoid the carpet area or the stepped area present in the cleaning area, in accordance with a second best way, the robot cleaner 100 is controlled to travel in a direction perpendicular to the area corresponding to the boundary line L2 and the stepped area line L3 marked on the map, which prevents the robot cleaner 100 from failing to complete a docking operation due to the presence of the boundary or the stepped area.

If the control unit 145 returns to operation 325 and the H/F mode is determined in operation 325 ('YES' in operation 325), the control unit 145 proceeds to operation A so as to perform the H/F mode as illustrated in FIG. 10B.

The control unit 145 acquires an RPM value of the main brush motor 166 from the RPM detector 175 and also acquires an upward image perpendicular to a traveling direction from the upward camera unit 135, thereby controlling the robot cleaner 100 so as to travel in a preset traveling pattern (405). The control unit 145 produces a map with respect to a cleaning area using the upward image acquired by the upward camera unit 135 during implementation of a cleaning operation.

Thereafter, the control unit 145 determines whether RPM of the main brush motor 166 rapidly rises (410). If RPM of the main brush motor 166 does not rapidly rise ('NO' in operation 410), the control unit 145 determines whether RPM of the main brush motor 166 is equal to or greater than a preset RPM (a reference RPM to distinguish the carpet area and the H/F area from each other, e.g., 1400 RPM) (415). If RPM of the main brush motor 166 is less than the preset RPM ('NO' in operation 415), the control unit 145 determines that the robot cleaner 100 is traveling in the carpet area and returns to operation 405 to allow the robot cleaner 100 to continuously travel in the preset traveling pattern. On the other hand, if RPM of the main brush motor 166 is equal to or greater than the preset RPM ('YES' in operation 415), the control unit 145 determines that the robot cleaner 100 is traveling in the H/F area and proceeds to operation 450.

If RPM of the main brush motor 166 rapidly rises ('YES' in operation 410), the control unit 145 determines that the robot cleaner 100 is passing the boundary between the carpet area and the H/F area or the stepped area. Thereby, under control of the control unit 145, the carpet area display light 181 and the H/F area display light 182 of the display unit 180 are alternately turned on (420).

Next, the control unit 145 assumes the boundary line or the stepped area line and controls the robot cleaner 100 so as to travel in a direction perpendicular to the assumed boundary line or stepped area line (425).

Thereafter, the control unit 145 determines whether RPM of the main brush motor 166 is equal to the previous RPM before rapid rising of RPM occurs (430). If RPM of the main brush motor 166 is equal to the previous RPM before rapid rising of RPM occurs ('YES' in operation 430), the control unit 145 determines that the robot cleaner 100 passes the stepped area and marks the stepped area (position) on the map (435) and then, returns to operation 405 so as to allow the robot cleaner to continuously travel in the preset traveling pattern.

On the other hand, if RPM of the main brush motor 166 is not equal to the previous RPM before rapid rising of RPM occurs ('NO' in operation 430), the control unit 145 determines whether RPM of the main brush motor 166 is greater than the previous RPM before rapid rising of RPM occurs (440).

If RPM of the main brush motor 166 is not greater than the previous RPM before rapid rising of RPM occurs ('NO' in operation 440), the control unit 145 determines that the robot cleaner 100 is moving from the H/F area to the carpet area. Thereby, under control of the control unit 145, the robot cleaner 100 is rotated to an introduction direction of the H/F area so as to travel in a direction perpendicular to the assumed boundary line or stepped area line (445).

On the other hand, if RPM of the main brush motor 166 is greater than the previous RPM before rapid rising of RPM occurs ('YES' in operation 440), the control unit 145 determines that the robot cleaner 100 is moving from the carpet area to the H/F area. Thereby, under control of the control unit 145, the H/F area display light 182 of the display unit 180 is turned on so as to indicate that the robot cleaner 100 travels in the H/F area (450).

Next, the control unit 145 begins to mark the boundary (position) on the map that is being made (455). Thereafter, the control unit 145 controls implementation of the H/F mode according to preset conditions (the number of traveling motions and the intensity of cleaning) (460). Thereby, the control unit 145 controls the robot cleaner 100 traveling in the H/F area so as to perform a cleaning operation only in an area where the main brush motor 166 operates at, e.g., 1500 RPM. Also, the control unit 145 recognizes the boundary and the stepped area by analyzing variation in RPM of the main brush motor 166 during implementation of the H/F mode and marks the boundary line L2 and the stepped area line L3 on the map. In addition, the control unit 145 assumes the boundary line or stepped area line and travels the robot cleaner 100 so as to travel in a direction perpendicular to the assumed boundary line or stepped area line.

Thereafter, the control unit 145 determines whether a combination of the boundary line L2 and the obstacle line L1 marked on the map defines a closed loop (465). If the boundary line L2 and the obstacle line L1 marked on the map do not define a closed loop ('NO' in operation 465), the control unit 145 returns to operation 460 to allow the robot cleaner 100 to continuously perform the H/F mode based on preset conditions.

On the other hand, if the combination of the boundary line L2 and the obstacle line L1 marked on the map defines a closed loop ('YES' in operation 465), the control unit 145 determines that the H/F mode is completed and begins a return (traveling) operation to the charging station 200. Thereby, the control unit 145 controls the robot cleaner 100 so as to return to the charging station 200 by traveling to avoid the carpet area and the stepped area line L3 using the produced map or by traveling in a direction perpendicular to the boundary line L2 and the stepped area line L3 marked on the map (470).

If the control unit 145 returns to operation 325 and the H/F mode is determined in operation 325 ('YES' in operation 325), the control unit 145 proceeds to operation A so as to perform the H/F mode as illustrated in FIG. 10B.

Then, if the control unit 145 returns to operation 305 and the cleaning mode command signal is not input ('NO' in operation 305) and only the start signal is input ('YES' in operation 310), and if the control unit 145 returns to operation 325 and determines that the H/F mode is not input ('NO' in operation 325), the control unit 145 proceeds to operation B so as to perform the auto mode as illustrated in FIG. 10C.

The control unit 145 acquires an RPM value of the main brush motor 166 from the RPM detector 175 and also, acquires an upward image perpendicular to a traveling direction from the upward camera unit 135, thereby controlling the robot cleaner 100 so as to travel in a preset traveling pattern (505). The control unit 145 produces a map with respect to a cleaning area using the upward image acquired by the upward camera unit 135 during implementation of a cleaning operation.

Thereafter, the control unit 145 determines whether RPM of the main brush motor 166 rapidly rises (510). If RPM of the main brush motor 166 does not rapidly rise ('NO' in operation 510), the control unit 145 returns to operation 505 to allow the robot cleaner 100 to continuously travel in the preset traveling pattern. On the other hand, if RPM of the main brush motor 166 rapidly rises ('YES' in operation 510), the control unit 145 determines that the robot cleaner 100 is passing the boundary between the carpet area and the H/F area or the stepped area. Thereby, under control of the control unit 145, the carpet area display light 181 and the H/F area display light 182 of the display unit 180 are alternately turned on (515).

Next, the control unit 145 assumes the boundary line or the stepped area line and controls the robot cleaner 100 so as to travel in a direction perpendicular to the assumed boundary line or stepped area line (520).

Thereafter, the control unit 145 determines whether RPM of the main brush motor 166 is equal to the previous RPM before rapid rising of RPM occurs (525). If RPM of the main brush motor 166 is equal to the previous RPM before rapid rising of RPM occurs ('YES' in operation 525), the control unit 145 determines that the robot cleaner 100 passes the stepped area and marks the stepped area (position) on the map (530) and then, returns to operation 505 so as to allow the robot cleaner to continuously travel in the preset traveling pattern.

On the other hand, if RPM of the main brush motor 166 is not equal to the previous RPM before rapid rising of RPM occurs ('NO' in operation 525), the control unit 145 determines whether RPM of the main brush motor 166 is less than the previous RPM before rapid rising of RPM occurs (535).

If RPM of the main brush motor 166 is less than the previous RPM before rapid rising of RPM occurs ('YES' in operation 535), the control unit 145 determines that the robot cleaner 100 is moving from the H/F area to the carpet area. Thereby, under control of the control unit 145, the carpet area display light 181 of the display unit 180 is turned on so as to indicate that the robot cleaner 100 travels in the carpet area (540). On the other hand, if RPM of the main brush motor 166 is not less than the previous RPM before rapid rising of RPM occurs ('NO' in operation 535), the control unit 145 determines that the robot cleaner 100 is moving from the carpet area to the H/F area. Thereby, under control of the control unit 145, the H/F area display light 181 of the display unit 180 is turned on so as to indicate that the robot cleaner 100 travels in the H/F area (545).

Next, the control unit 145 begins to mark the boundary (position) on the map that is being made (550). Thereafter, the control unit 145 controls implementation of the auto mode according to preset conditions (the number of traveling motions and the intensity of cleaning) (560). For example, the control unit 145 controls the robot cleaner 100 so as to perform a cleaning operation by traveling once when the robot cleaner 100 travels in the H/F area and to perform a cleaning operation by traveling twice when the robot cleaner 100 travels in the carpet area. Alternatively, the robot cleaner 100 may be controlled to perform a cleaning operation by traveling once throughout the entire cleaning area and then, again perform a cleaning operation once only with respect to a specific cleaning area marked as the carpet area on the map. Also, the control unit 145 recognizes the boundary and the stepped area by analyzing variation in RPM of the main brush motor 166 during implementation of the auto mode and marks the boundary line L2 and the stepped area line L3 on the map. In addition, the control unit 145 assumes the boundary line or stepped area line and controls the robot cleaner 100 so as to travel in a direction perpendicular to the assumed boundary line or stepped area line.

Thereafter, the control unit 145 determines whether the entire cleaning area is completely cleaned (565). In this case, the control unit 145 determines that the entire cleaning area is completely cleaned if the obstacle line L1 marked on the map defines a closed loop and the interior of the closed loop is marked as the cleaned area. If the entire cleaning area is not completely cleaned ('NO' in operation 565), the control unit 145 returns to operation 560 so as to continuously perform the auto mode based on preset conditions.

If the cleaning of the entire cleaning area is completed ('YES' in operation 565), the control unit 145 begins a return (traveling) operation to the charging station 200. Thereby, the control unit 145 controls the robot cleaner 100 so as to return to the charging station 200 by traveling to avoid the carpet area and the stepped area line L3 using the produced map or by traveling in a direction perpendicular to the boundary line L2 and the stepped area line L3 marked on the map (570).

Although the present embodiment has described the case of determining the material or state of the floor using RPM of the main brush motor 166 detected by the RPM detector 175 or variation in RPM of the main brush motor 166 by way of example, the present embodiment is not limited thereto. The material or state of the floor may be determined using a value of current passing through the main brush motor 166 or variation in the value of current passing through the main brush motor 166.

In general, the value of current passing through the main brush motor 166 is proportional to the magnitude of load. Thus, the value of current passing through the main brush motor 166 is lowest in a state in which the main brush 160 does not come into contact with the floor (e.g., the robot cleaner 100 is left between the floor and the stepped area such as a doorsill, stairway or thick carpet to enter the stepped area, or the robot cleaner 100 is overturned). Also, the value of current passing through the main brush motor 166, in a state in which the robot cleaner 100 travels in the H/F area where load is reduced, is less than the value of current passing through the main brush motor 166 in a state in which the robot cleaner 100 travels in the carpet area where load is increased. In this way, the material or state of the floor may be determined using the value of current passing through the main brush motor 166 or variation in the value of current passing through the main brush motor 166.

As is apparent from the above description, in a robot cleaner in accordance with one embodiment of the present disclosure, a carpet mode to clean only a carpet area and an H/F mode to clean an H/F area excluding the carpet area are given based on detected information relating to the material of a floor (carpet or H/F). This enables partial cleaning with respect to a cleaning area selected by a user and also, enables adjustment in the number of cleaning operations (the number of traveling motions) or the intensity of cleaning according to the material of the floor.

Further, in accordance with another embodiment of the present disclosure, the robot cleaner is controlled based on detected information relating to the material or state of a floor (stepped area, carpet fringes, etc.) so as not to turn near the stepped area and the boundary of a carpet and an H/F where the robot cleaner may get stuck during traveling, but to move perpendicular to the stepped area or the boundary. This prevents the robot cleaner from failing to complete a cleaning or docking operation due to the presence of the stepped area or the boundary.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A robot cleaner comprising:
   a main brush to brush a floor;
   a main brush motor to rotate the main brush;
   a Revolution Per Minute (RPM) detector to detect an RPM of the main brush motor;
   a control unit configured to determine whether the floor is a carpeted floor area or a hard floor area based on the detected respective RPM's of the main brush motor, when the robot cleaner is moving across the carpeted floor area or the hard floor area;
   an input unit on an exterior surface of the robot cleaner to allow a user of the robot cleaner to select between only one of a carpeted floor area cleaning mode or a hard floor area cleaning mode;
   an upward camera unit to capture an upward image perpendicular to a traveling direction of the robot cleaner;
   wherein the control unit produces a map using the upward image acquired by the upward camera unit and the detected respective RPM's such that the carpeted area, the hard floor area, a boundary between the carpeted floor area and the hard floor area and a stepped area are marked on the map;
   a storage for storing the map,
   wherein the control unit is further configured to clean either the carpeted floor area or the hard floor area based on the map, and
   wherein the control unit uses only the RPM of the main brush when determining the carpeted floor area or the hard floor area.

2. The robot cleaner according to claim 1, wherein the control unit adjusts a number of traveling motions of the robot cleaner or the RPM of the main brush motor based on whether the area being cleaned is the carpeted floor area or the hard floor area.

3. The robot cleaner according to claim 1, wherein the control unit determines that the robot cleaner is traveling in the carpeted floor area if the RPM of the main brush motor is less than a preset RPM and determines that the robot cleaner is traveling in the hard floor area if the RPM of the main brush motor is greater than the preset RPM.

4. The robot cleaner according to claim 3, wherein the control unit determines that the robot cleaner passes the boundary or the stepped area when the RPM of the main brush motor increases abruptly.

5. The robot cleaner according to claim 4, wherein the control unit determines that the robot cleaner having passed through the hard floor area enters the carpeted floor area if the RPM of the main brush motor is less than an RPM before the RPM of the main brush motor increases abruptly.

6. The robot cleaner according to claim 4, wherein the control unit determines that the robot cleaner having passed through the carpeted floor area enters the hard floor area if the RPM of the main brush motor is greater than an RPM before the RPM of the main brush motor increases abruptly.

7. The robot cleaner according to claim 1, wherein the control unit controls the robot cleaner using the produced map so as to avoid the carpet area, the boundary or the stepped area when the robot cleaner returns to a docking station after completing the cleaning operation based on the selected cleaning mode.

8. The robot cleaner according to claim 4, further comprising a display unit to display that the robot cleaner is traveling in the carpeted floor area or the hard floor area.

* * * * *